US012789678B2

(12) United States Patent
Liu

(10) Patent No.: US 12,789,678 B2
(45) Date of Patent: Nov. 10, 2026

(54) AUTOMATIC PIVOTING MECHANISM, SIDE IMPACT PROTECTION DEVICE, AND CHILD SAFETY SEAT

(71) Applicant: WONDERLAND SWITZERLAND AG, Steinhausen (CH)

(72) Inventor: Zujian Liu, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 77 days.

(21) Appl. No.: 18/853,235

(22) PCT Filed: May 19, 2023

(86) PCT No.: PCT/EP2023/063505
§ 371 (c)(1),
(2) Date: Oct. 1, 2024

(87) PCT Pub. No.: WO2023/222893
PCT Pub. Date: Nov. 23, 2023

(65) Prior Publication Data

US 2025/0242731 A1 Jul. 31, 2025

(30) Foreign Application Priority Data

May 20, 2022 (CN) ........................ 202210558285.5

(51) Int. Cl.
*B60N 2/28* (2006.01)
*B60N 2/90* (2018.01)

(52) U.S. Cl.
CPC ......... *B60N 2/2884* (2013.01); *B60N 2/2821* (2013.01); *B60N 2/2869* (2013.01); *B60N 2/919* (2018.02); *B60N 2002/948* (2018.02)

(58) Field of Classification Search
CPC .... B60N 2/2869; B60N 2/919; B60N 2/2884; B60N 2/42781; B60N 2/42772;
(Continued)

(56) References Cited

U.S. PATENT DOCUMENTS 10,933,779 B2 3/2021 Cui
12,552,291 B2 * 2/2026 Cheng .................... B60N 2/002
(Continued)

FOREIGN PATENT DOCUMENTS

CN 207550009 U * 6/2018
CN 110126773 A * 8/2019 ........... B60N 2/2884
(Continued)

OTHER PUBLICATIONS

English translation for CN-110126773-A (Year: 2019).*
(Continued)

*Primary Examiner* — David R Dunn
*Assistant Examiner* — Troy Alan Libby
(74) *Attorney, Agent, or Firm* — CANTOR COLBURN LLP

(57) ABSTRACT

An automatic pivoting mechanism according to the application is provided for controlling relative movement of a first object and a second object, wherein the automatic pivoting mechanism includes: a locking mechanism, disposed in the first object and capable of switching between a locked position for preventing the relative movement and an unlocked position for allowing the relative movement; a driving mechanism, disposed in the second object and capable of being actuated to switch the locking mechanism from the locked position to the unlocked position; and an actuating mechanism, disposed in a third object and actuates the driving mechanism when the third object moves relative to a fourth object. A side impact protection device and a child safety seat are provided as well.

17 Claims, 29 Drawing Sheets

(58) Field of Classification Search
CPC ...... B60N 2/427; B60N 2/42727; B60N 2/26; B60N 2/2827; B60N 2002/0055; B60N 2/2821; B60R 21/02
See application file for complete search history.

(56) References Cited

U.S. PATENT DOCUMENTS

| | | | | |
|---|---|---|---|---|
| 2014/0054944 | A1 | 2/2014 | Locke et al. | |
| 2015/0266402 | A1 | 9/2015 | Lutzka | |
| 2020/0101876 | A1* | 4/2020 | Cui | B60N 2/2872 |
| 2022/0097576 | A1 | 3/2022 | Zhang et al. | |

FOREIGN PATENT DOCUMENTS

| | | | | | |
|---|---|---|---|---|---|
| CN | 111845480 | A | * | 10/2020 | B60N 2/4235 |
| CN | 113276741 | A | * | 8/2021 | B60N 2/2821 |
| CN | 113815502 | A | * | 12/2021 | B60N 2/2821 |
| CN | 113859065 | A | | 12/2021 | |
| CN | 114162004 | A | | 3/2022 | |
| CN | 114407739 | A | | 4/2022 | |
| CN | 216636244 | U | | 5/2022 | |
| DE | 202015104791 | U1 | * | 11/2015 | B60N 2/2884 |
| DE | 202017105584 | U1 | | 12/2018 | |
| DE | 202018006242 | U1 | * | 9/2019 | B60N 2/4235 |
| JP | H0713241 | U | | 3/1995 | |
| JP | 2015521558 | A | | 7/2015 | |
| JP | 2020183223 | A | | 11/2020 | |
| JP | 2021017239 | A | | 2/2021 | |
| KR | 20120011317 | A | | 2/2012 | |
| TW | 202202373 | A | | 1/2022 | |
| TW | 202214459 | A | | 4/2022 | |
| TW | 202229046 | A | | 8/2022 | |
| WO | 0112465 | A1 | | 2/2001 | |
| WO | 2010001886 | A1 | | 1/2010 | |
| WO | 2018054249 | A1 | | 3/2018 | |
| WO | 2022003034 | A1 | | 1/2022 | |

OTHER PUBLICATIONS

English translation for CN-111845480-A (Year: 2020).*
English translation for CN-113276741-A (Year: 2021).*
English translation for CN-113815502-A (Year: 2021).*
English translation for CN-207550009-U (Year: 2018).*
English translation for DE-202015104791-U1 (Year: 2015).*
English translation for DE-202018006242-U1 (Year: 2019).*
Taiwanese Application No. 113135398; First Office Action dated Mar. 4, 2025; pp. 1-11.
CN 1st Office Action with English Translation; Appl No. 202210558285.5; Date Mailed: Dec. 25, 2025; pp. 1-16.
JP 1st Office Action with English Translation; App No. 2024-555392; Date Mailed: Oct. 28, 2025; pp. 1-4.
International Search Report for International Application No. PCT/EP2023/063505; International Filing Date: May 19, 2023; Date of Mailing: Aug. 21, 2023; 3 pages.
Taiwanese Application No. 112118541; First Office Action dated Jan. 25, 2024; 7 pages.
Written Opinion for International Application No. PCT/EP2023/063505; International Filing Date: May 19, 2023; Date of Mailing: Aug. 21, 2023; 4 pages.

* cited by examiner

AUTOMATIC PIVOTING MECHANISM, SIDE IMPACT PROTECTION DEVICE, AND CHILD SAFETY SEAT

CROSS-REFERENCE TO RELATED APPLICATIONS

This application is a National Stage application of PCT/EP2023/063505, entitled "AUTOMATIC PIVOTING MECHANISM, SIDE IMPACT PROTECTION DEVICE, AND CHILD SAFETY SEAT" and filed on May 19, 2023, which claims the benefit of Chinese Application No. 202210558285.5, filed on May 20, 2022, both of which are incorporated herein by reference in their entirety.

TECHNICAL FIELD

The application relates to an automatic pivoting mechanism, a side impact protection device including the automatic pivoting mechanism, and a child safety seat including the side impact protection device.

BACKGROUND

A child safety seat is equipment installed on a car seat. In the event of emergency braking or accidental collision of the car, the safety seat reduces the impact on child, and restricts the child's body movement, so as to reduce injuries suffered by the child in accidents and ensure safety of the child in travelling.

In some safety seats, side impact protection devices re provided to mitigate the lateral impact received by the seat. A side impact protection device is side wings extending from both outer sides of a seat, which has a folded position and an unfolded position. In the folded position, the side impact protection device is attached to the outer sides of the seat, so as to reduce the occupied space; and in the unfolded position, the side impact protection device protrudes outward from side faces of the seat, so as to provide cushioning between the seat and the car.

SUMMARY

An automatic pivoting mechanism according to the application is provided for controlling relative movement of a protection block body (first object) and a seat (second object), the automatic pivoting mechanism comprises: a locking mechanism, disposed in the first object and capable of switching between a locked position for preventing the relative movement and an unlocked position for allowing the relative movement; a driving mechanism, disposed in the second object and capable of being actuated to switch the locking mechanism from the locked position to the unlocked position; and an actuating mechanism, disposed in a third object and actuates the driving mechanism when the third object moves relative to a fourth object.

Benefitted from the automatic pivoting mechanism of the application, the relative movement between the protection block body and the seat can be automatically unlocked according to the relative movement between the rotating seat and the base, thereby realizing a linkage among the multiple objects, reducing the operation of users and improving the use experience.

In an embodiment, the protection block body can be pivoted in respect to the seat between an unfolded position and a folded position, and hen the protection block body is in the unfolded position, the locking mechanism can be switched to the locked position, such that the protection block body is kept in the unfolded position; a foldable elastic member is disposed at a pivot joint between the protection block body and the seat, and the foldable elastic member biases the protection block body to the folded position.

The protection block body is kept in the unfolded position, and is biased to the folded position by the foldable elastic member. Therefore, as long as position locking of the protection block body is unlocked, the protection block body will automatically move to the folded position.

In an embodiment, when the protection block body is in the folded position, the driving mechanism keeps the locking mechanism in the unlocked position.

When the protection block body is in the folded position, the locking mechanism will not prevent the protection block body from moving to the unfolded position. Thus, when the user needs to reset the protection block body to the unfolded position, only the protection block body has to be operated, and the locking mechanism is not necessary to be simultaneously operated.

In an embodiment, the locking mechanism comprises: a locking pin, slidably disposed in the protection block body and capable of sliding between an extended position to be engaged with the seat and a retracted position to be disengaged from the seat; a slotted portion, disposed on the seat and having a locking slot opened toward the locking pin, and the locking pin is at least partially inserted into the locking slot while in the extended position; and a locking elastic member, disposed between the locking pin and the protection block body and biasing the locking pin to the extended position.

Through the mechanism of the locking mechanism, an operable locking relationship between the protection block body and the seat is realized.

In an embodiment, the locking mechanism further comprises: a release member, connected to the locking pin and capable of being operated from an outside of the protection block body to switch the locking pin between the extended position and the retracted position.

The user can directly unlock the protection block body by operating the release member, without unlocking the protection block body through relative movement between the rotating seat and the base. Thus, the user is provided with another operation option to unlock the protection block body.

In an embodiment, the driving mechanism comprises: a cam, pivotably disposed in the seat and capable of abutting against the locking pin, the cam is provided with a driving portion and an avoidance portion arranged circumferentially adjacent to each other, wherein the cam is capable of being pivoted such that the driving portion abuts against the locking pin thereby driving the locking pin to slide to the retracted position, or being pivoted such that the avoidance portion faces the locking pin thereby allowing the locking pin to slide to t extended position; and a traction member, connected between the cam and the actuating mechanism, the actuating mechanism is capable of actuating the cam to be pivoted through the traction member, such that the driving portion abuts against the locking pin.

By providing the cam, the locking pin can moves between the extended position and the retracted position according to pulling action of the traction member.

In an embodiment, the driving mechanism further comprises: a cam elastic member, disposed between the cam and the seat to exert a force for driving the cam to be pivoted such that the avoidance portion faces the locking pin.

The cam elastic member is used for reset movement of the cam. If the cam is not pulled by the traction member, the cam will be automatically reset and allow the locking pin to move to the extended position.

In an embodiment, the actuating mechanism comprises: a locking member, connected to the traction member, including: a locking member first end, abutting against the base; and a locking member second end, movably coupled to the rotating seat; when the rotating seat and the base move relatively, the locking member first end is disengaged from the base, and the locking member second end slides in a pulling direction and pulls the traction member.

The locking member serve to convert the relative movement between the base and the rotating seat into pulling action of the traction member.

In an embodiment, the actuating mechanism comprises: an actuating mechanism elastic member, disposed between the rotating seat and the locking member, and biases the locking member second end in a direction opposite to the pulling direction.

The actuating mechanism elastic member serve to reset the locking member.

In an embodiment, the locking member is a locking lever, the locking member first end is a locking lever first end, the locking member second end is a locking lever second end, and the locking lever second end is connected to the traction member; the base is provided with a limit slot that is opened to the rotating seat, and the locking lever extends obliquely from the rotating seat to the base in respect to the pulling direction, such that the locking lever first end is capable of being abutted against in the limit slot, when the rotating seat and the base move relatively, the locking lever first end is rotated out of the limit slot toward the rotating seat; and the actuating mechanism further comprises an auxiliary rod, the auxiliary rod includes: an auxiliary rod first end, pivotably connected to an auxiliary rod engaging portion of the locking lever between the locking lever first end and the locking lever second end; and an auxiliary rod second end, pivotably connected to the rotating seat.

The auxiliary rod defines a movement direction of the locking lever, which forces the locking lever not to rotate only around the locking lever second end while rotating out of the limit slot, but also pulling the traction member simultaneously.

In an embodiment, the auxiliary rod second end is located at a position in a direction opposite to the pulling direction in respect to the locking lever second end; and the auxiliary rod first end is connected to a substantively middle position of the locking lever.

The above arrangement of the auxiliary rod can effectively limit the movement of the locking lever without causing much resistance.

In an embodiment, the locking lever first end is in a shape of a triangle protruding toward the base, two inclined planes of the triangle respectively form two guide inclined planes, the limit slot has portions respectively corresponding to the two guide inclined planes, and when the rotating seat moves relative to the base in different directions, the two guide inclined planes are separated from abutment with the limit slot, such that the locking lever first end is rotated out of limit slot toward rotating seat.

According to the above structures of the locking lever first end and the limit slot, when the base rotates clockwise or counterclockwise relative to the rotating seat, the actuating mechanism can move in the same way.

In an embodiment, the locking member is a locking slider, the locking member first end is a slider first end, and the locking member second end is a slider second end; the base is provided with a limit slot that is opened to the rotating seat; the locking slider is located in a slider slot of the rotating seat and capable of sliding close to or away from the base, and when the rotating seat and the base move relatively, the limit slot pushes the slider first end, such that the locking slider slides away from the base; the locking slider is provided with an actuating slot extending obliquely to the sliding direction of the locking slider, a traction head of the traction member is slidably inserted in the actuating slot, such that when the locking slider slides away from the base, the locking slider pulls the traction member.

The locking slider provides another way to implementing the locking member, which can also pull the traction member according to relative movement between the base and the rotating seat.

In an embodiment, the rotating seat is provided with a guiding slot; the guiding slot is disposed vertically below the locking slider, and extend in the pulling direction; and the traction head is also slidably inserted in the guiding slot, thus being limited to slide in the pulling direction.

The guiding slot can limit the moving direction of the traction head, thereby avoiding unexpected movement of the traction head.

In an embodiment, the foldable elastic member is a torsion spring.

The torsion spring can simply provide a folding force for a foldable member.

In an embodiment, the driving portion has an arc surface that is convex outwardly in respect to a pivot axis of the cam, and the avoidance portion has an arc surface that is concave inwardly in respect to the pivot axis of the cam.

The above shape of the cam is beneficial for smooth movement of the locking pin.

A side impact protection device according to the application comprises: the automatic pivoting mechanism according to the application; and a protection block body.

Accordingly, the application realizes the automatic folding function of the side impact protection block.

A child safety seat according to the application comprises: a base; a rotating seat, rotatably disposed above the base; a seat, disposed above the rotating seat; and the side impact protection device according to the application, the side impact protection block of the side impact protection device is disposed on one or two sides of the seat.

The automatic folding function of the side impact protection block of the application can be applied to the child safety seats.

In an embodiment, the seat is fixed to the rotating seat or capable of sliding back and forth or swing in respect to the rotating seat.

The seat can slid back and forth or swing, which provides a function of adjusting the pitch angle of the seat. Since the traction member is used to connect the locking mechanism and the driving mechanism in the application, when the seat is performed a pitch angle adjustment, the linkage relationship between the locking mechanism and the driving mechanism will not be affected.

BRIEF DESCRIPTION OF THE DRAWINGS

In FIG. 8, the side impact protection block is in the unfolded position, in which the cam is in an avoidance position and the locking pin is in the extended position; in FIG. 9, the side impact protection block is in the unfolded position, in which the cam is in a abutting position, and the locking pin is in a retracted position. In FIG. 10, the side impact protection block is in the folded position, in which the cam is in the abutting position, and the locking pin is in the retracted position. In FIG. 11, the side impact protection block is in the folded position, the cam will return to the avoidance position, and the locking pin is in the retracted position;

DETAILED DESCRIPTION

In some applications of the child safety seats, the seat can rotate back and forth relative to the base. When the seat rotates, the protruding side impact protection block may interfere with a top rod disposed on the base, and it is impossible to directly turn the seat forward or backward. The side impact protection block is manually before turning the seat, which affects the convenience in use.

Therefore, an automatic pivoting mechanism is demanded for the side impact protection block. When the seat rotates back and forth seat relative to the base, the automatic folding structure can automatically fold the side impact protection block.

Although the invention is illustrated and described herein with reference to specific embodiments, it should not be limited to the details shown. Specifically, various modifications may be made to these details within the scope of equivalents of claims without departing from the invention.

The directional descriptions such as “front,” “back,” “upper,” and “lower” are referred to herein only for convenience of understanding. The invention is not intended to be limited to the related directions, but can be adjusted according to the actual situation. Although the application is described with reference to typical embodiments, the terminology used is illustrative and exemplary, not restrictive.

Referring to FIGS. 1 to 5, a child safety seat 1 according to the application will be generally described.

Figure 1:
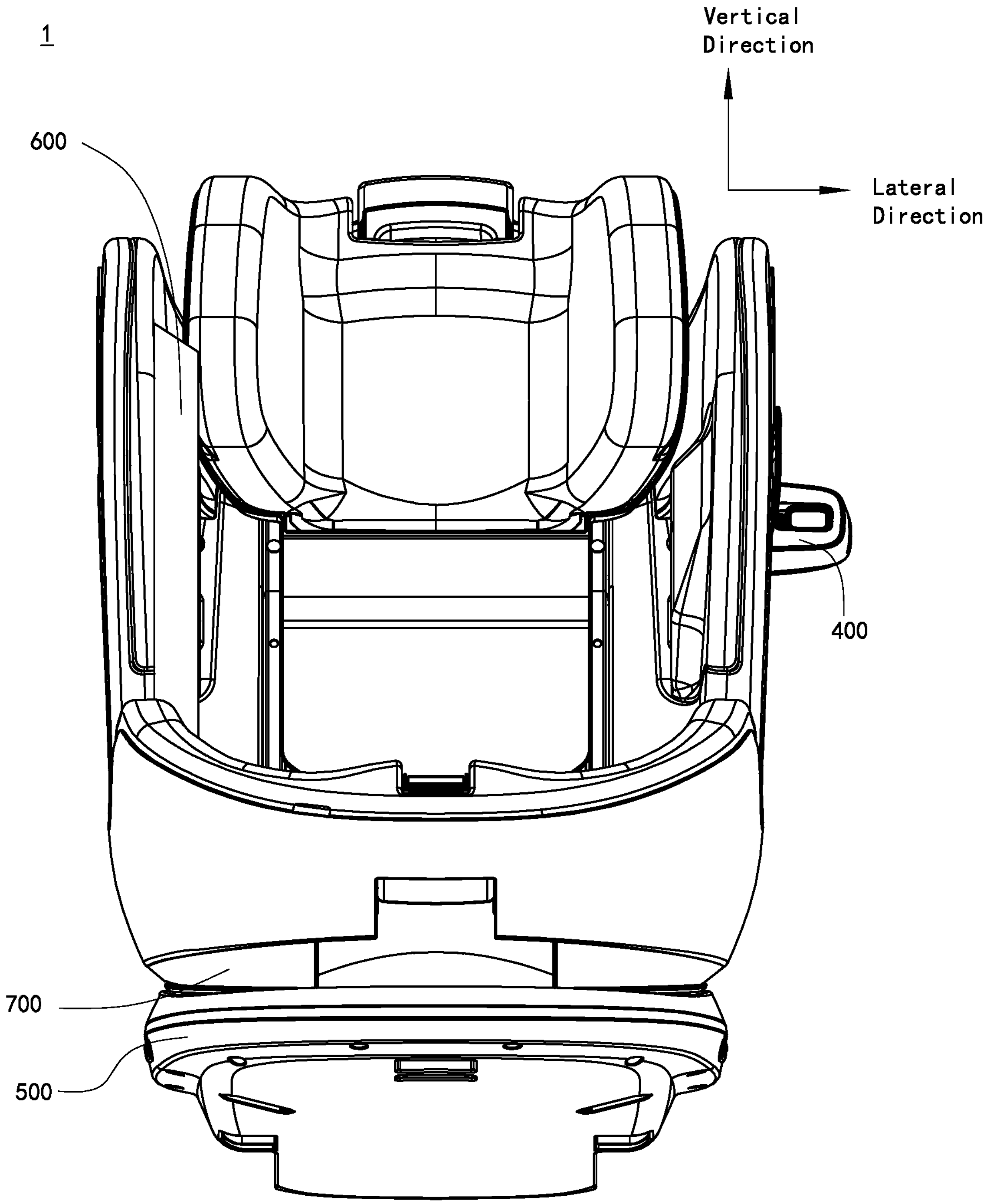
FIG. 1 is a front view of a child safety seat according to the application, in which a side impact protection block on a side is in an unfolded position.
Figure 2:
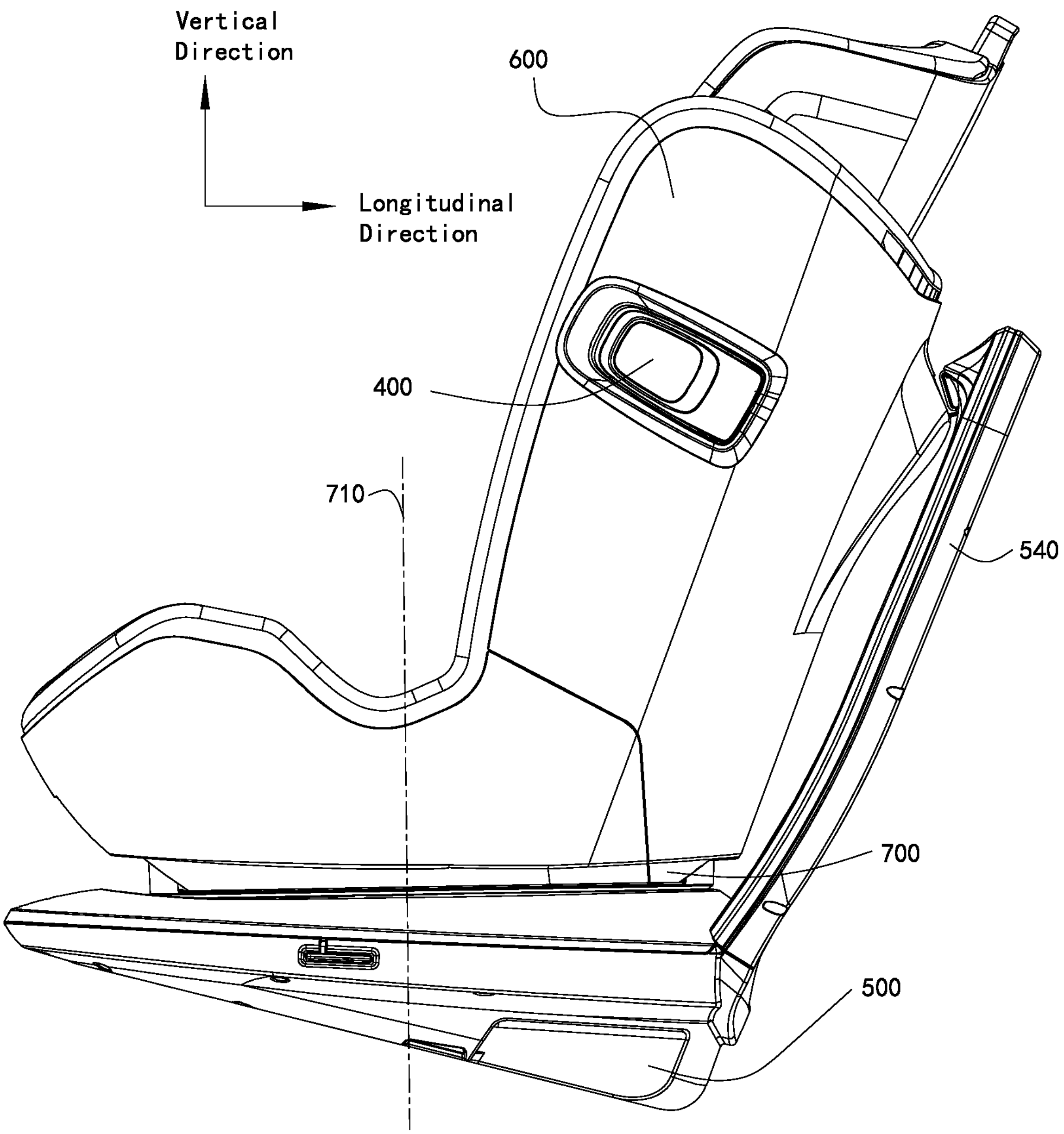
FIG. 2 is a side view of the child safety seat, in which the side impact protection block is in a folded position.
Figure 3:
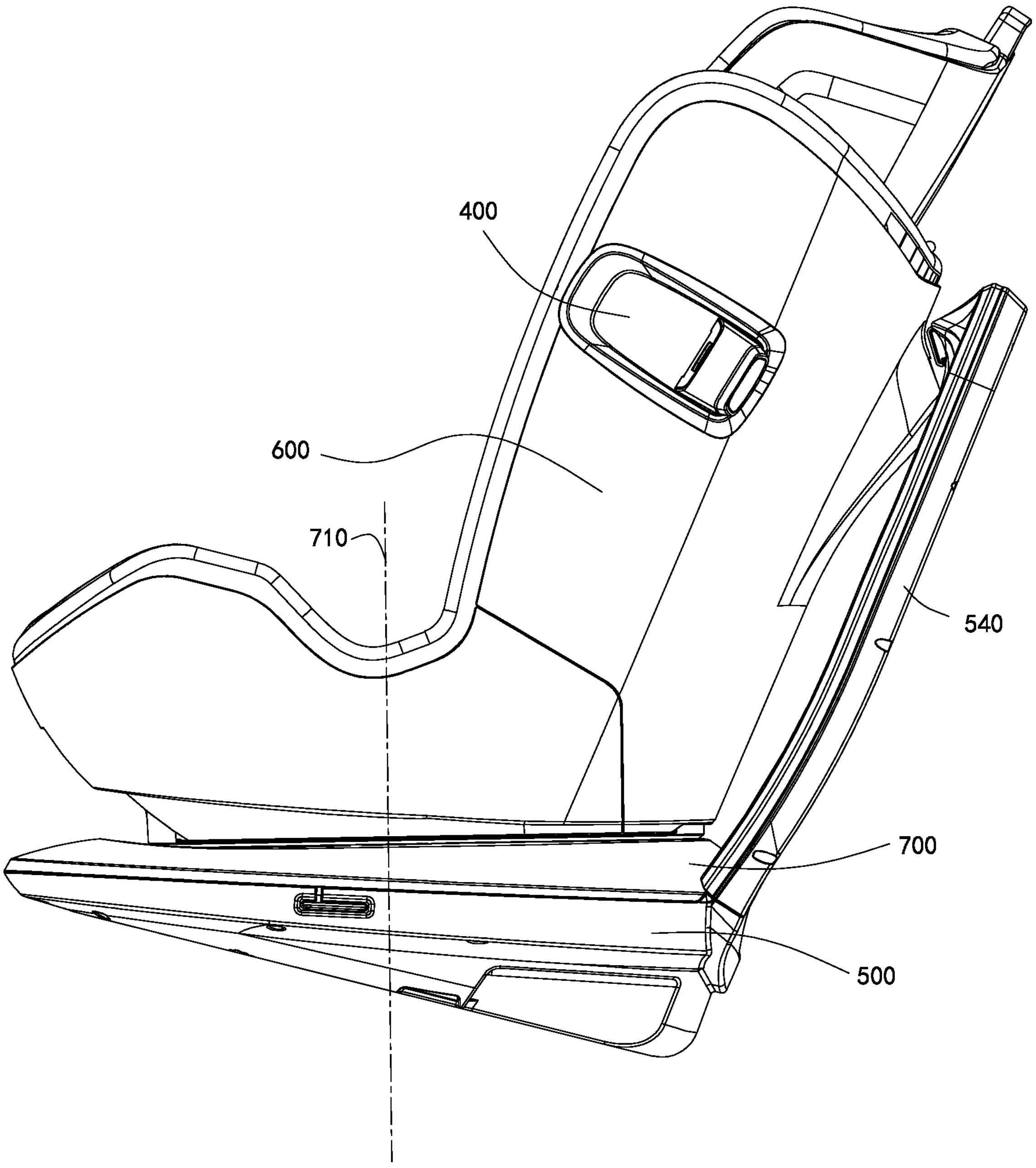
FIG. 3 is a side view of the child safety seat with the side impact protection block in the unfolded position.

The child safety seat includes a base 500, a rotating seat 700, a seat 600, and a side impact protection devices 400. The base 500 is used to install the child safety seat 1 to a carrier seat 600 such as a car seat. The rotating seat 700 is rotatably disposed above the base 500, and can rotate around a substantially vertical axis 710 relative to the base 500, such that the seat 600 can be switched between a forward position (as shown in FIGS. 1 to 3) and a rearward position (not shown). The seat 600 is disposed above the rotating seat 700, and rotates relative to the base 500 together with the rotating seat 700. In some applications, the seat 600 may be fixed to the rotating seat 700, and in other applications, the seat 600 may slide or swing back and forth in respect to the base 500, such that the seat 600 performs a pitch adjustment function. The present invention is applicable to both applications. There may be one or two side impact protection blocks 400 respectively disposed on one side or both sides of the seat 600 and extend laterally from a side face of the seat 600.

Figure 4:
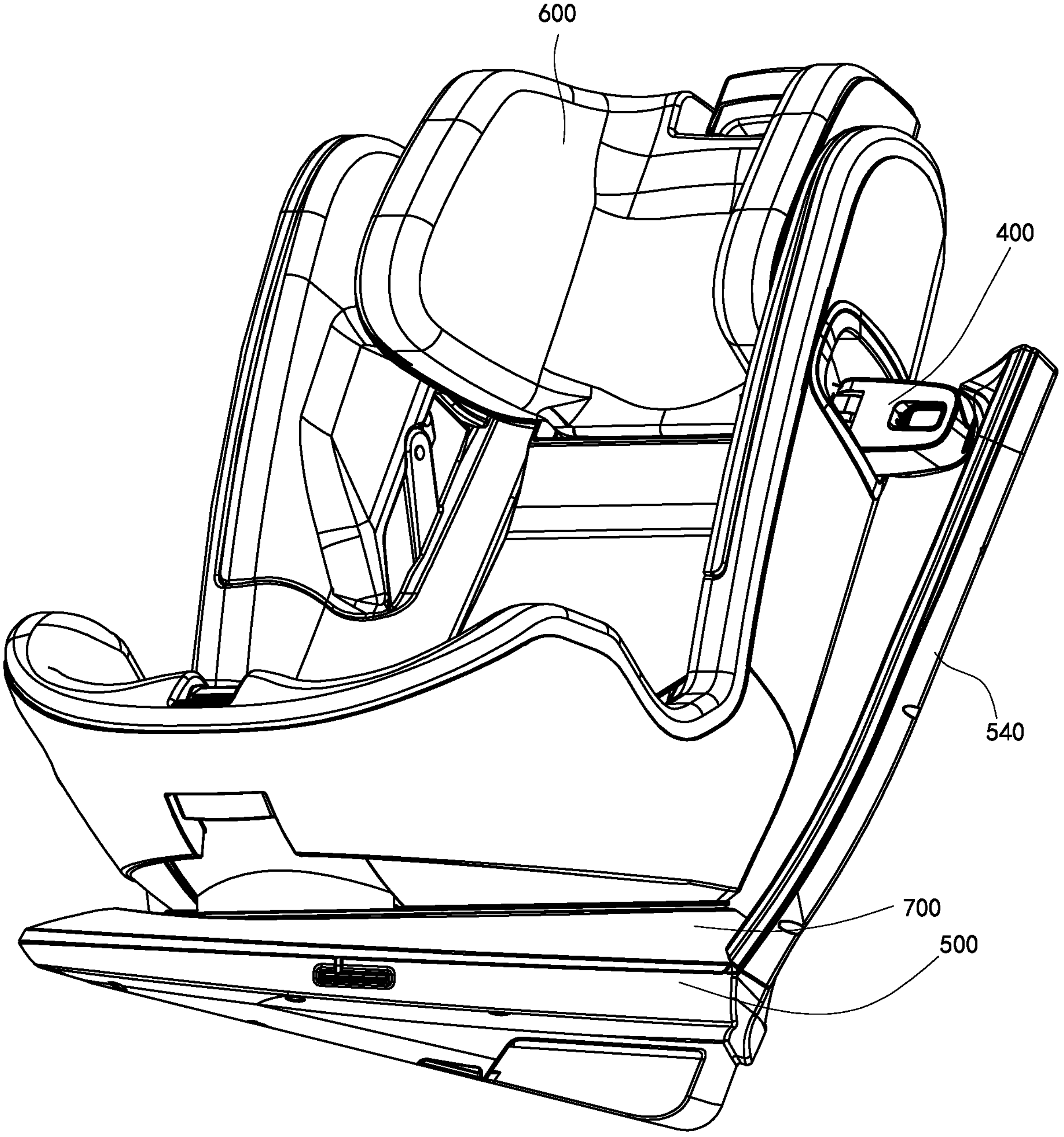
FIG. 4 shows a situation of the unfolded side impact protection block in respect to a base top rod when the seat rotates relative to the base.

A top rod 540 extending approximately vertically upward is disposed behind the base 500 for abutting against a backrest of the car seat, so as improve stability of the child safety seat 1. As shown in FIG. 4, when the seat 600 and the rotating seat 700 rotate relative to the base 500, if the side impact protection block 400 is in the unfolded position, the side impact protection block 400 may be blocked by the top rod 540, such that the seat 600 and the rotating seat 700 cannot be rotated to the place.

Figure 5:
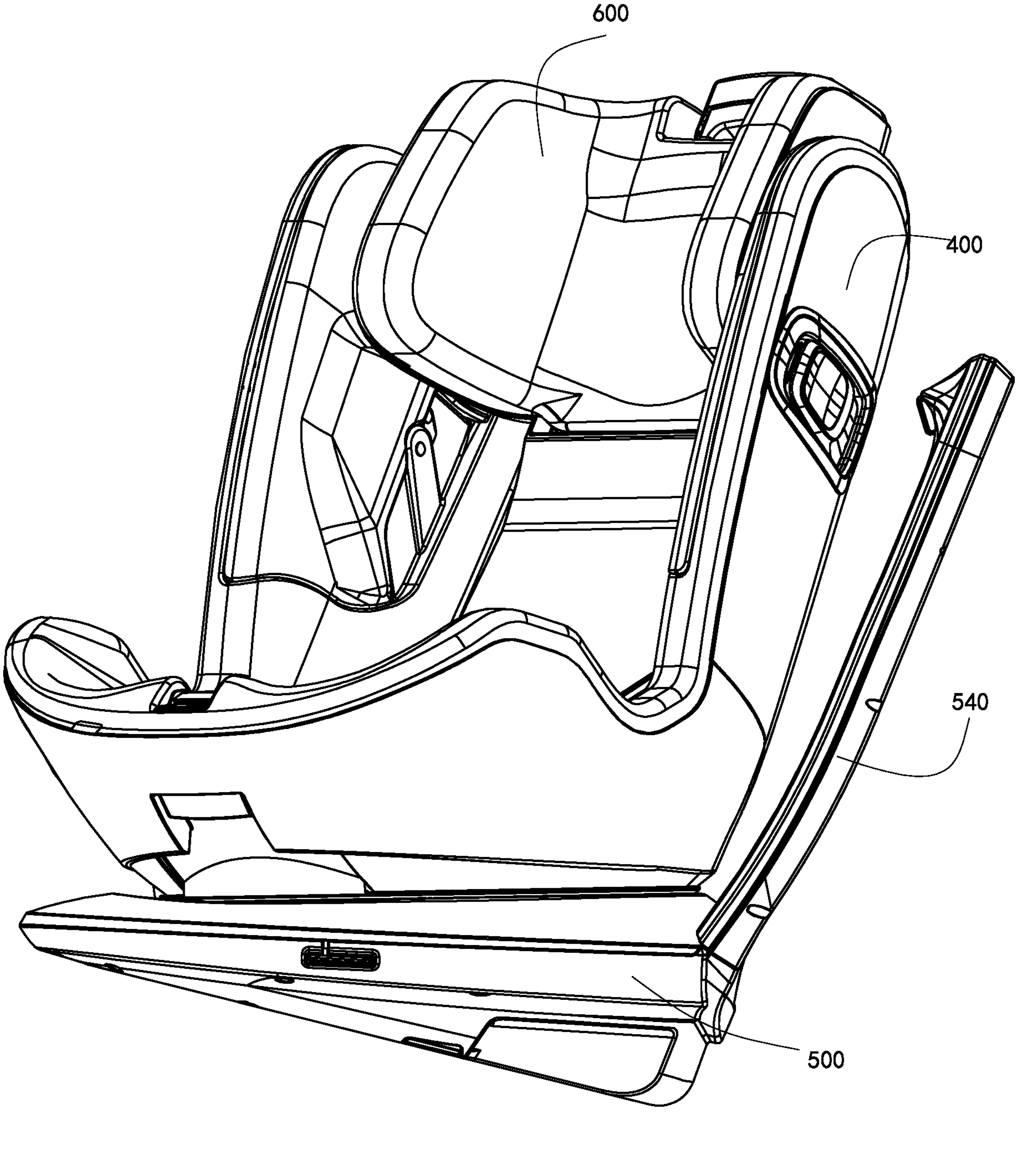
FIG. 5 shows a situation of the folded side impact protection block in respect to the base top rod when the seat rotates relative to the base.

The child safety seat 1 according to the application is provided with an automatic pivoting mechanism, such that when the seat 600 and the rotating seat 700 rotate relative to the base 500, the side impact protection block 400 is automatically pivoted in respect to the seat 600 from the unfolded position to the folded position. In this way, interference and collision between the side impact protection block 400 the top rod 540 can be well avoided, and the child safety seat 1 can be avoided from being damaged. At the same time, it is not necessary to manually fold the side impact protection block 400 and then rotate the seat 600, which greatly improves the convenience in use and operation of the child safety seat 1, as shown in FIG. 5.

As shown in FIGS. 6 to 12, the automatic pivoting mechanism according to the application includes a locking mechanism 100, a driving mechanism 200, and an actuating mechanism 300. The locking mechanism 100 is disposed in the side impact protection block 400, and can be switched between a locked position that prevents the side impact protection block 400 from moving relative to the seat 600 and an unlocked position that allows this relative movement. The driving mechanism 200 is disposed in the seat 600, and can be actuated to switch the locking mechanism 100 from the locked position to the unlocked position. The actuating mechanism 300 is disposed in the rotating seat 700, and actuates the driving mechanism 200 when the rotating seat 700 (and the seat 600 as well) moves relative to the base 500, such that the driving mechanism 200 unlocks the locking mechanism 100.

As shown in FIGS. 8 to 11, the side impact protection block 400 includes a housing 410 and a protection block body 420. The housing 410 is installed on a side face of the seat 600 or formed as a part of the seat 600. The housing 410 has an accommodating space 411 for accommodating the protection block body 420 therein.

The protection block body 420 can be pivoted in respect to the housing 410 (and the seat 600 as well) between the unfolded position and the folded position. When the protection block body 420 is in the unfolded position, the locking mechanism 100 can be switched to the locked position, such that the protection block body 420 is maintained in the unfolded position. A foldable elastic member, such as a torsion spring, is disposed at a pivot joint between the protection block body 420 and the seat 600, and the torsion spring always exerts an inward folding force on the protection block body 420 to bias the protection block body 420 to the folded position. In addition, when the protection block body 420 is in the folded position, the driving mechanism 200 keeps the locking mechanism 100 in the unlocked position.

Figure 8:
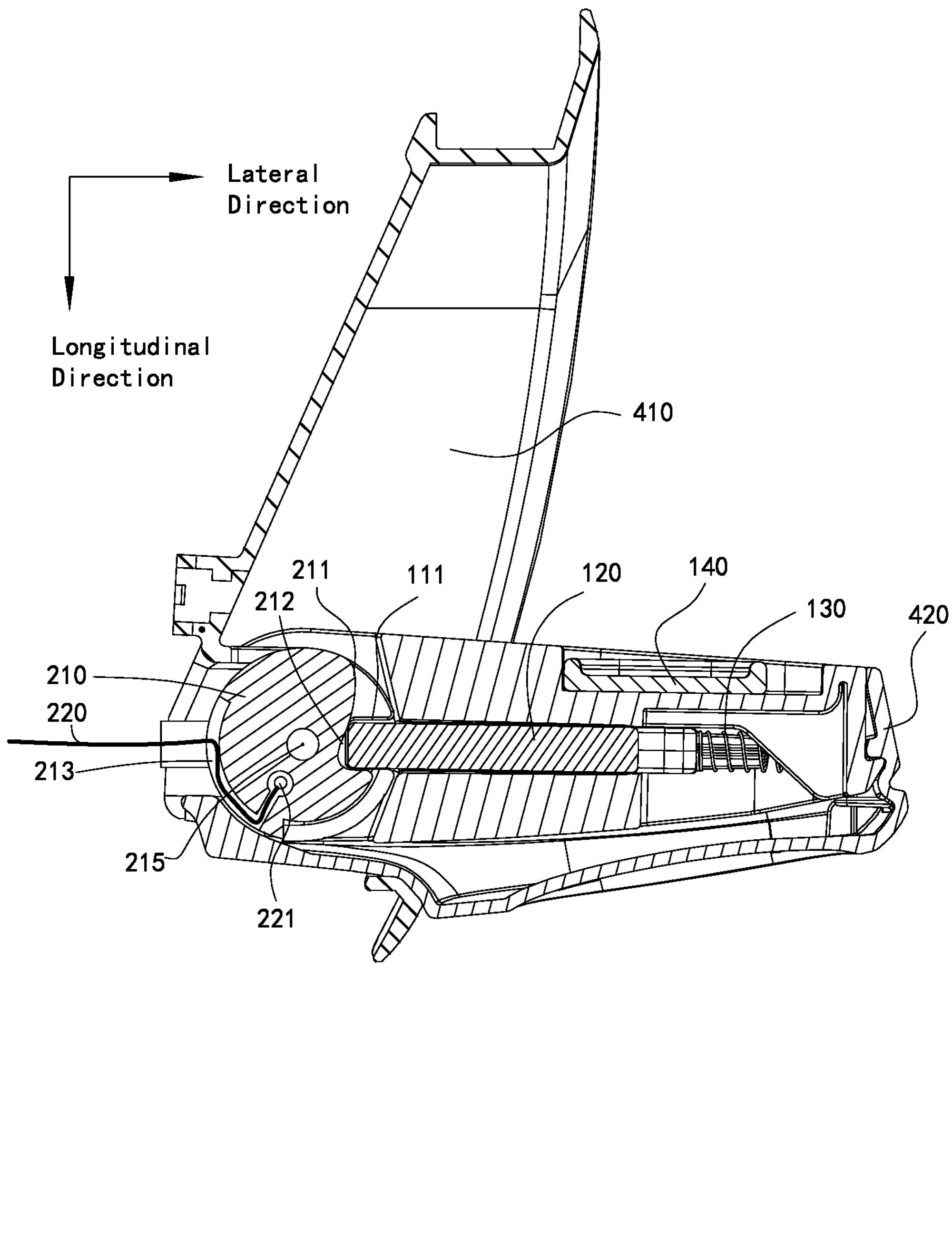
FIGS. 8 to 11 are top cross-sectional views of the side impact protection block, respectively, showing four states of the side impact protection block in a process from unfolding to folding.
Figure 9:
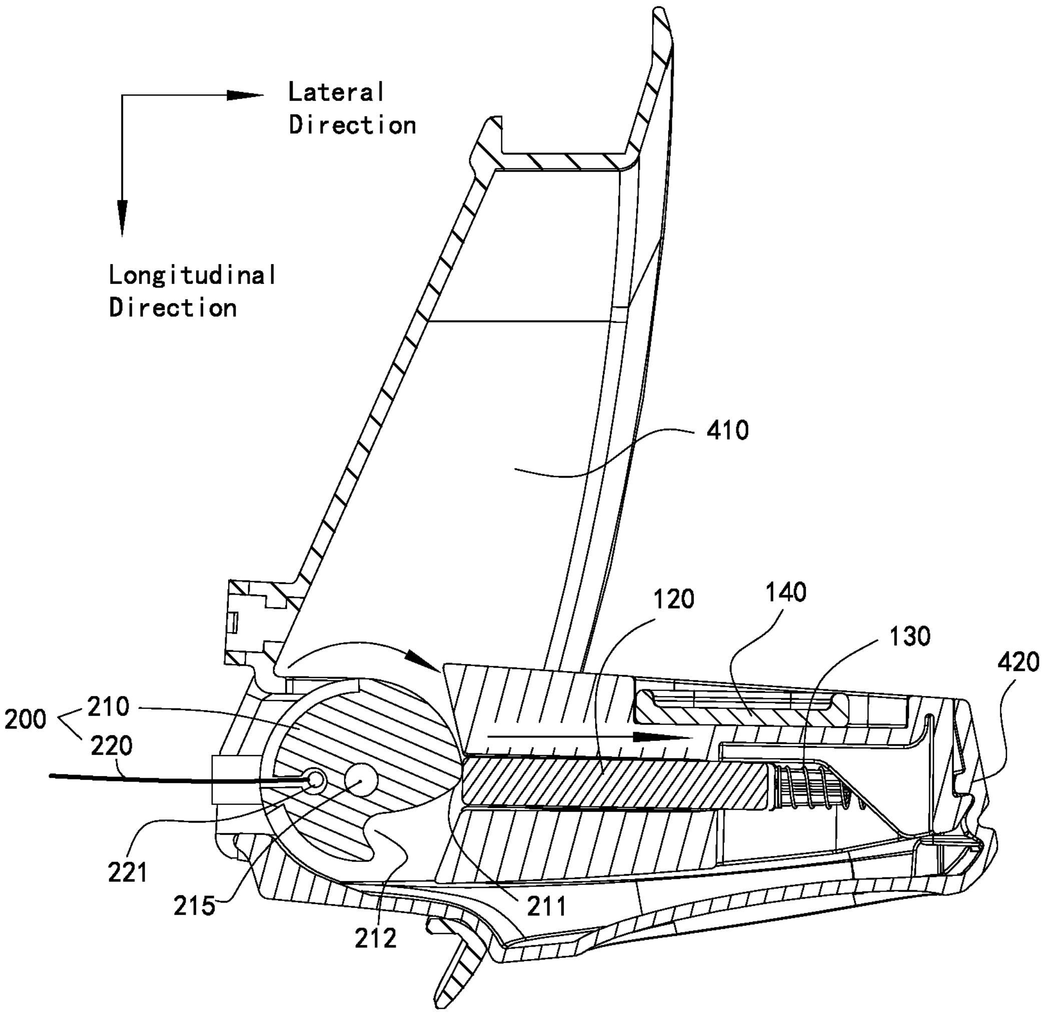
Figure 10:
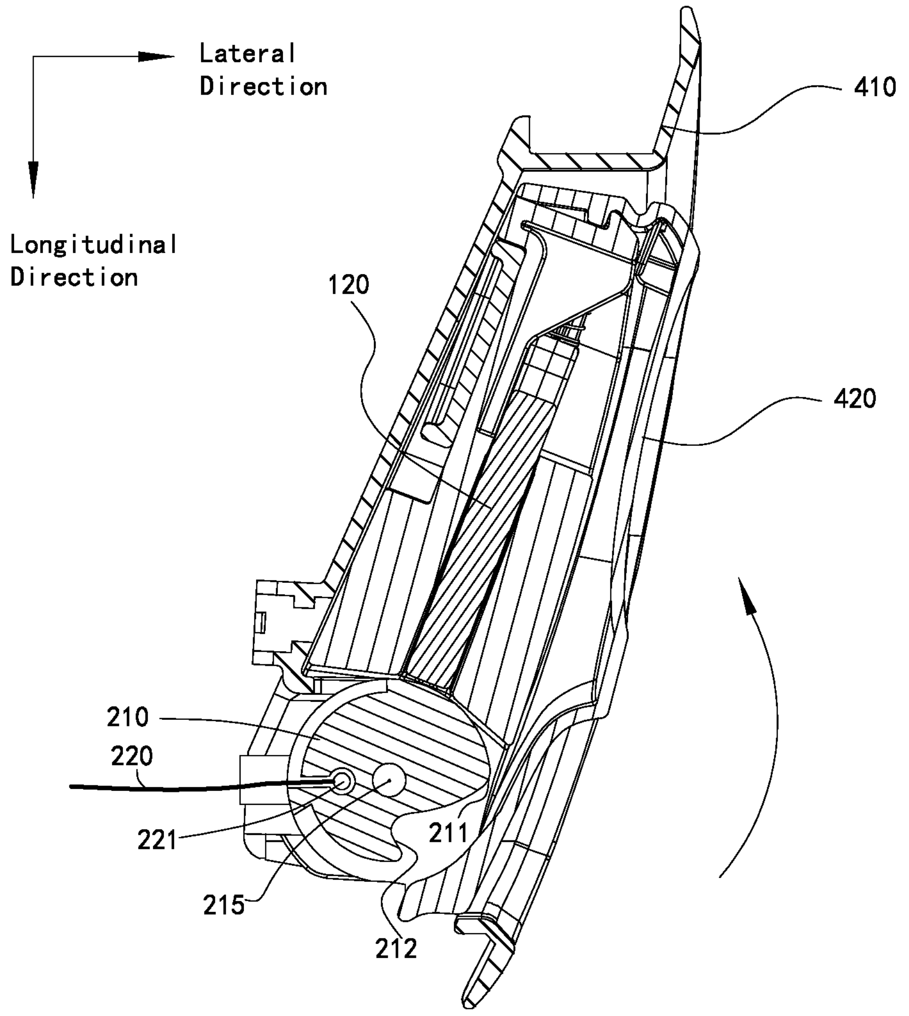
Figure 11:
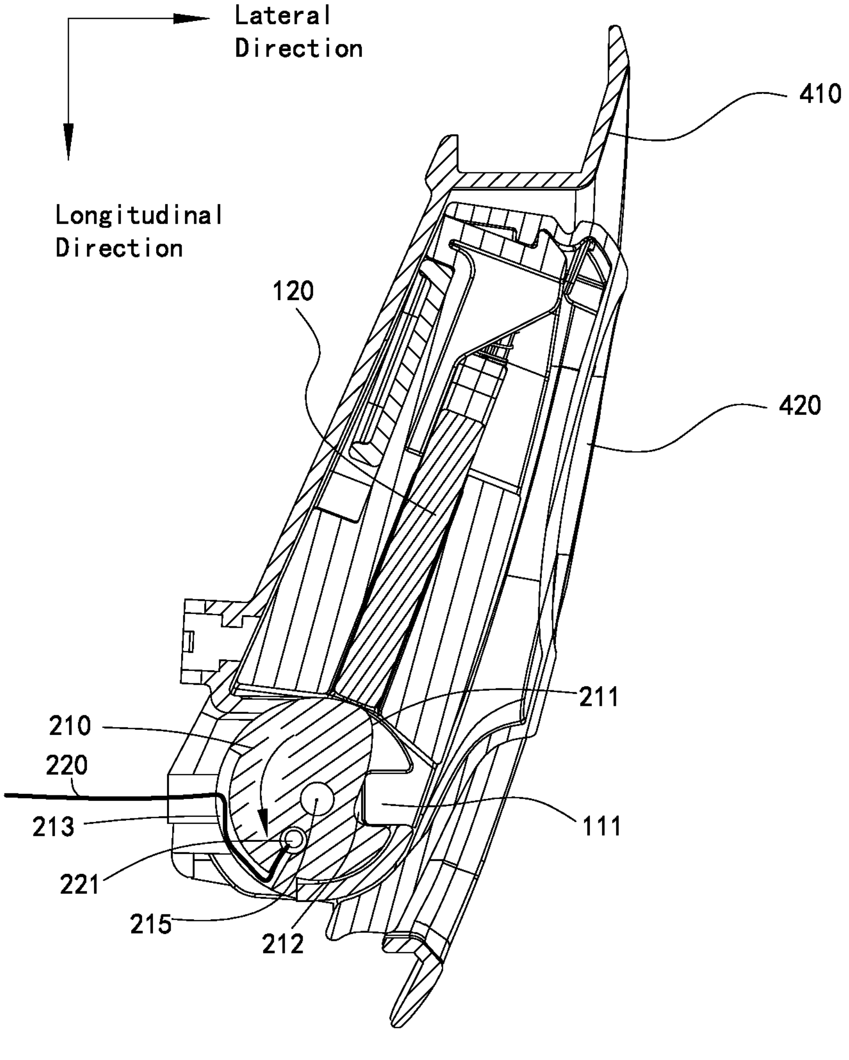
Figure 12:
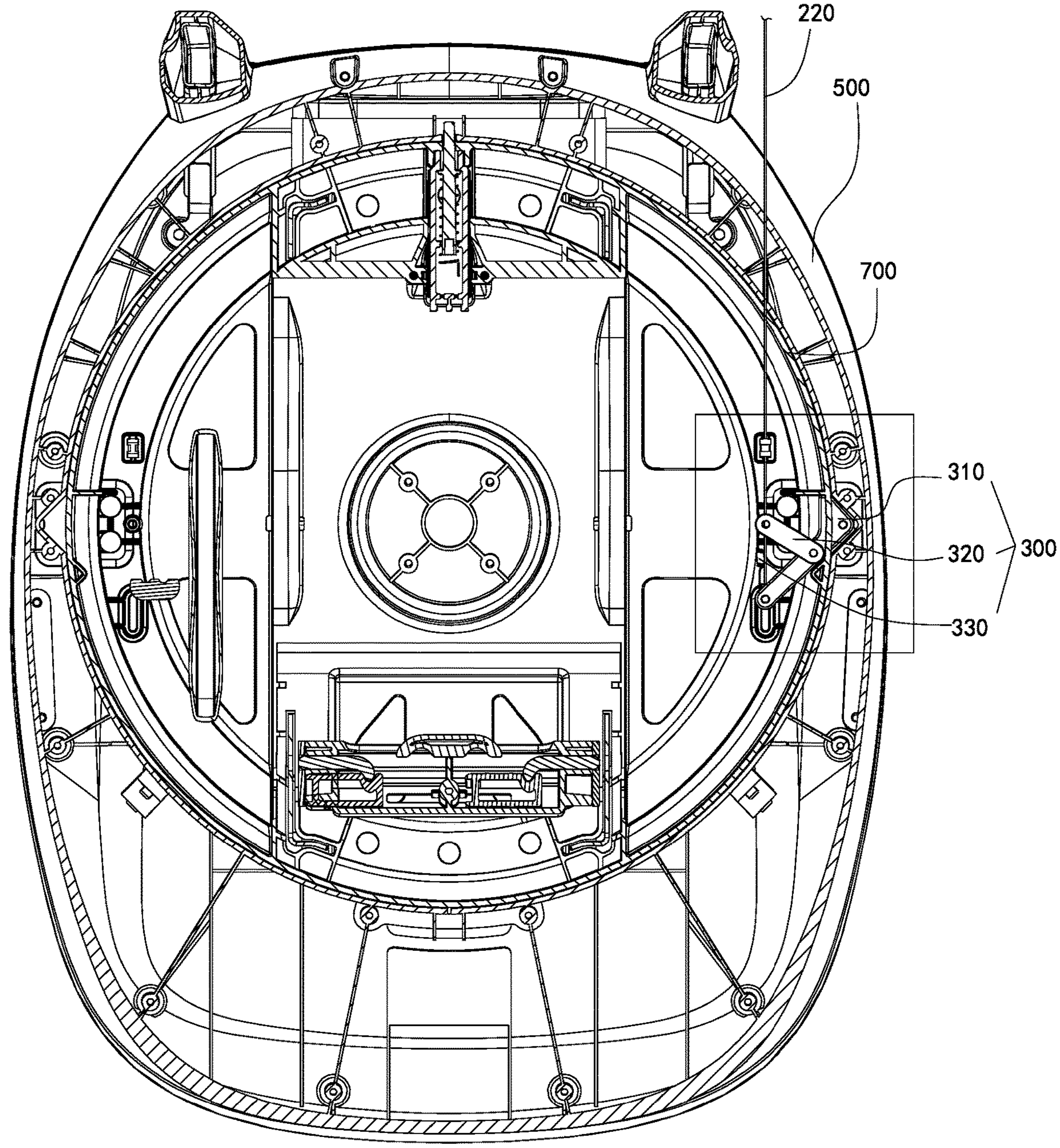
FIG. 12 is a top view of the base and the actuating mechanism of the child safety seat according to the first embodiment of the application, in which the seat is in a forward position or a rearward position in respect to the base.
Figure 13:
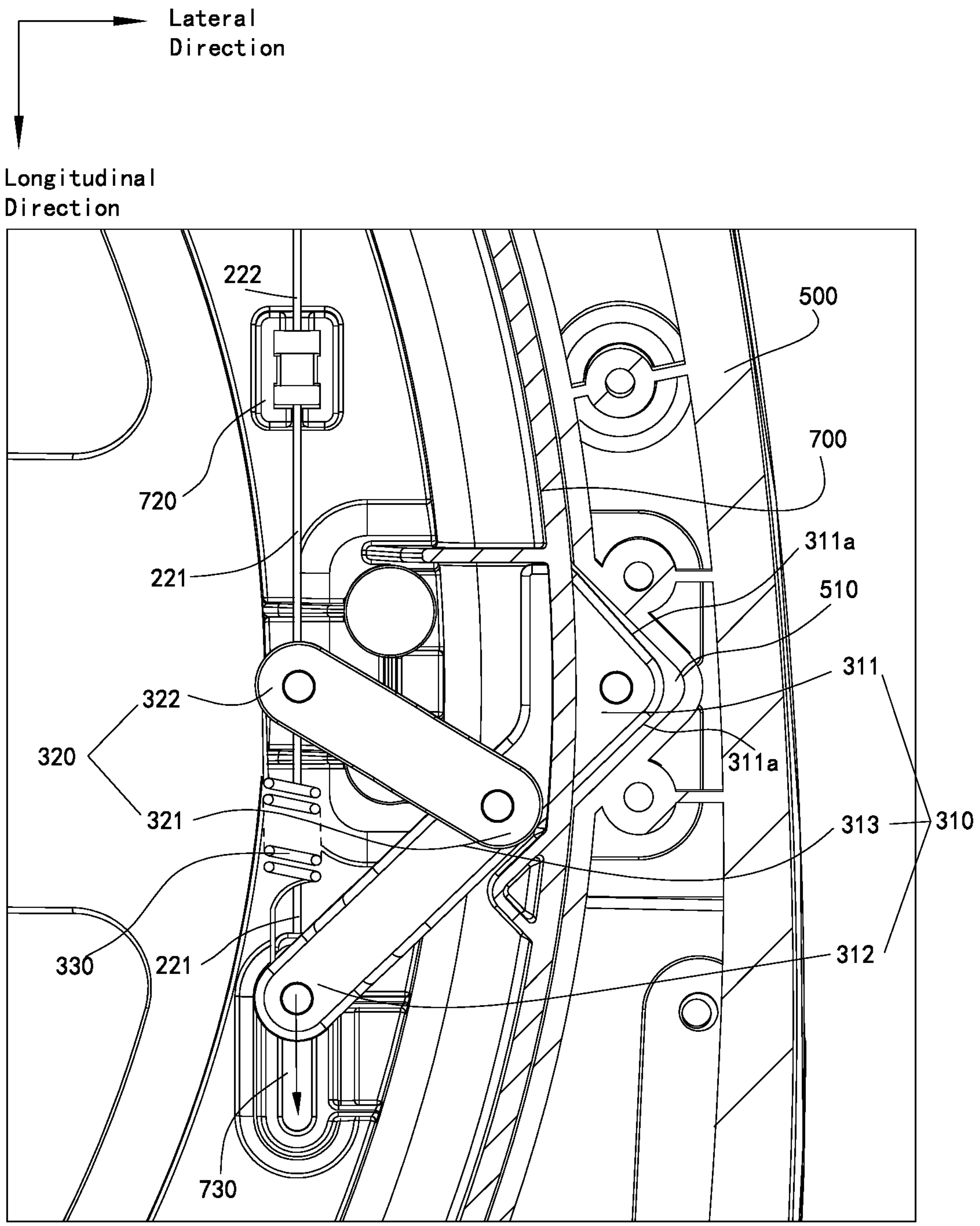
FIG. 13 is a partial enlarged view of the block part in FIG. 12.

Therefore, as shown in FIGS. 8 and 9, when the protection block body 420 is in the unfolded position, the locking mechanism 100 locks the protection block body 420 in the unfolded position. As shown in FIG. 10, when the rotating seat 700 (and the seat 600 as well) rotates relative to the base 500, the driving mechanism 200 drives the actuating mechanism 300 and further drives the locking mechanism 100, such that the locking mechanism 100 no longer locks the protection block body 420 in the unfolded position. At this time, the protection block body 420 will be biased to the folded position by the torsion spring, thus realizing automatic folding. When the protection block body 420 needs to be unfolded, because the locking mechanism 100 will not lock the protection block body 420 being in the folded position, the protection block body 420 can be manually pulled to the unfolded position.

Referring to FIGS. 6 to 11 again, the locking mechanism 100 and the driving mechanism 200 according to the application will be described.

The locking mechanism 100 includes a locking pin 120, a slotted portion 110, a locking elastic member 130, and may also include a release member 140.

The locking pin 120 is slidably disposed in the protection block body 420, and can slide between an extended position to be engaged with the seat 600 and a retracted position to be disengaged from the seat 600. More specifically, the locking pin 120 has a substantially cylindrical shape. In the extended position, the locking pin 120 extends at least partially out of the protection block body 420.

Figure 6:
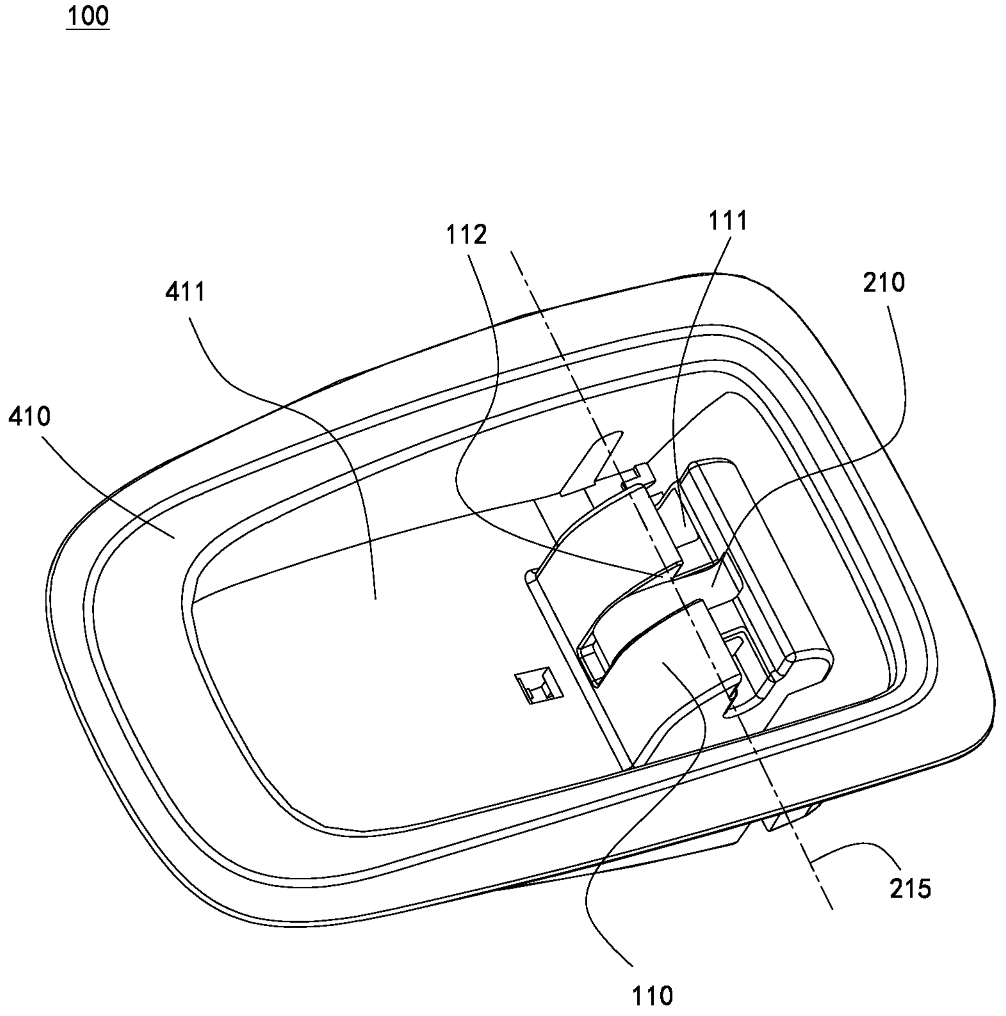
FIGS. 6 and 7 are front perspective views and back perspective views of a housing and a cam of the side impact protection block, respectively.

As shown in FIG. 6, the slotted portion 110 is disposed on the seat 600 (in other words, on the housing 410), and has a locking slot 111 opened toward the locking pin 120. The locking pin 120 is at least partially inserted into the locking slot 111 while in the extended position. The slotted portion 110 may be formed as a part of a side face of the seat 600. An extending direction of the locking slot 111 faces the protection block body 420 being in the unfolded position, thus allowing the locking pin 120 to be inserted into the locking slot 111 when the protection block body 420 is pivoted to the unfolded position, such that the protection block body 420 is locked from pivoting. A cam 210 of the driving mechanism 200 can operatively block the locking pin 120 from entering the slotted portion 110, which will be described in detail later.

Referring to FIG. 8, the locking elastic member 130 is disposed between the locking pin 120 and the protection block body 420, and biases the locking pin 120 to the extended position. Thus, when the protection block body 420 is pivoted to the unfolded position, the locking pin 120 will automatically lock the protection block body 420. In this embodiment, the locking elastic member 130 may be a spring with one end sleeved on one end of the locking pin 120, and the other end of the spring is connected in the protection block body 420.

Still referring to FIG. 8, the release member 140 is disposed on a surface of the protection block body 420 facing outward or toward the housing 410, and connected to the locking pin 120. The release member 140 can be pressed and slid from the outside of the protection block body 420 to switch the locking pin 120 between the extended position and the retracted position in respect to the protection block body 420. Thus, the user can directly operate the locking pin 120 by the release member 140 (rather than by the actuating mechanism 300) to unlock pivoting of the protection block body 420 in respect to the seat 600.

As shown in FIGS. 7 to 11, the driving mechanism 200 includes a cam 210, a traction member 220, and may also include a cam elastic member 214.

The cam 210 is pivotably disposed in the seat 600, and can abut against the locking pin 120. The cam 210 is provided with a driving portion 211 and a avoidance portion 212 which are arranged circumferentially adjacent to each other, wherein the driving portion 211 has an arc surface that is convex outwardly in respect to a pivot axis 215 of the cam 210, and the avoidance portion 212 has an arc surface that is concave inwardly in respect to the pivot axis 215 of the cam 210. When the protection block body 420 is in the unfolded position, the cam 210 can be pivoted such that the driving portion 211 abuts against the locking pin 120, thereby driving the locking pin 120 to slide to the retracted position (as shown in FIG. 9), or be pivoted such that the avoidance portion 212 faces the locking pin 120, thereby allowing the locking pin 120 to slide to the extended position (as shown in FIG. 8). When the protection block body 420 is in the folded position, the cam 210 keeps the locking pin 120 in the retracted position by resisting the force of the locking elastic member 130 biasing the locking pin 120.

More specifically, the cam 210 is disposed in a cam slot 112 of the slotted portion 110. The axial direction of the cam 210 is substantively perpendicular to the sliding direction of the locking pin 120. The cam slot 112 and the locking slot 111 are substantively perpendicular to each other, that is, the cam slot 112 is substantively parallel to the radial direction of the cam 210, and the locking slot 111 is substantively parallel to the axial direction or the pivot axis 215 of the cam 210. The driving portion 211 is apart from the avoidance portion 212 by a circumferential distance of about 90 degrees, and the circumferential distance can also be set to a larger or smaller angle according to the actual situation, for example, between 30 degrees and 150 degrees.

A cable slot 213 is opened on the periphery of the cam 210 to make the traction member 220 pass therethrough. The cable slot 213 is at least partially provided along the outer periphery of the cam 210, so as to guide a cable 221 to extend along the outer periphery of the cam 210 and be engaged into the cam 210.

The traction member 220 is connected between the cam 210 and the actuating mechanism 300, and the actuating mechanism 300 can actuate the cam 210 to be pivoted by the traction member 220, such that the driving portion 211 abuts against the locking pin 120.

Figure 7:
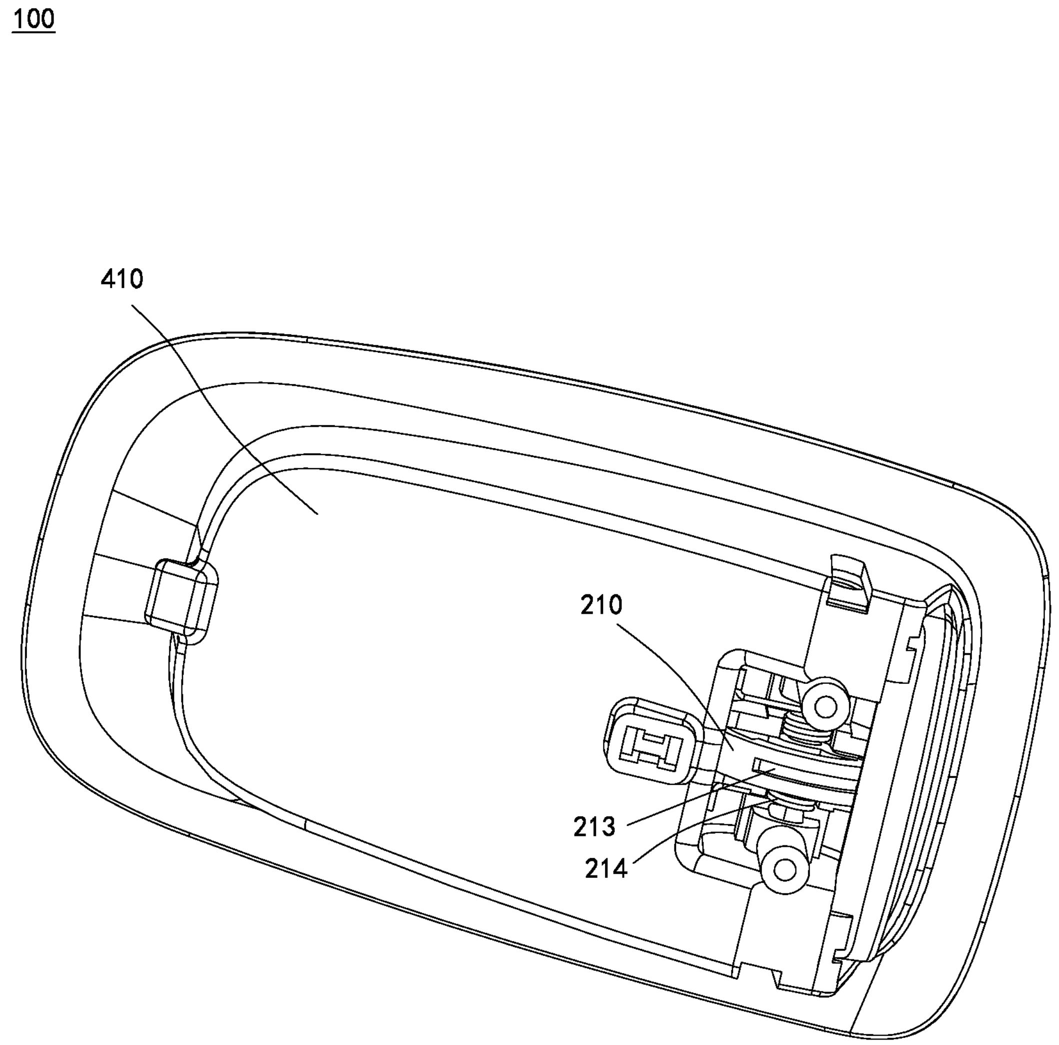

As shown in FIG. 7, the cam elastic member 214 is disposed between the cam 210 and the seat 600 to exert a force for driving the cam 210 to be pivoted such that the avoidance portion 212 faces the locking pin 120. Thus, when the actuating mechanism 300 does not drive the driving mechanism 200, the avoidance portion 212 of the cam 210 always faces the locking pin 120, allowing the locking pin 120 to slide to its locked position.

Referring to FIGS. 12 to 16, the actuating mechanism 300 according to a first embodiment of the application will be described. The actuating mechanism 300 of the first embodiment includes a locking member (in this embodiment, a locking lever 310), an actuating mechanism elastic member 330, and may also include an auxiliary rod 320.

Figure 15:
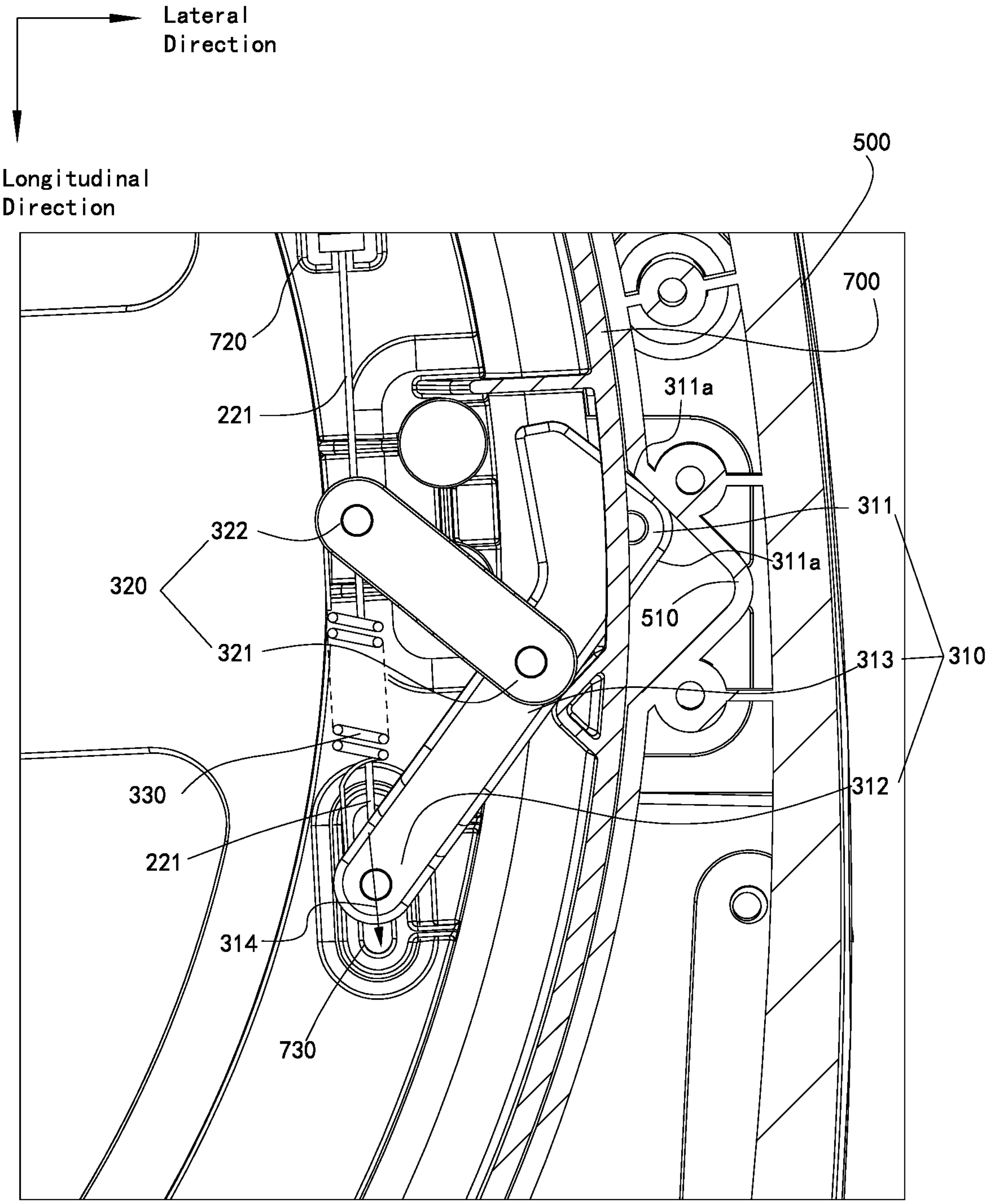
FIG. 15 is a partial enlarged view of the block part in FIG. 14.
Figure 16:
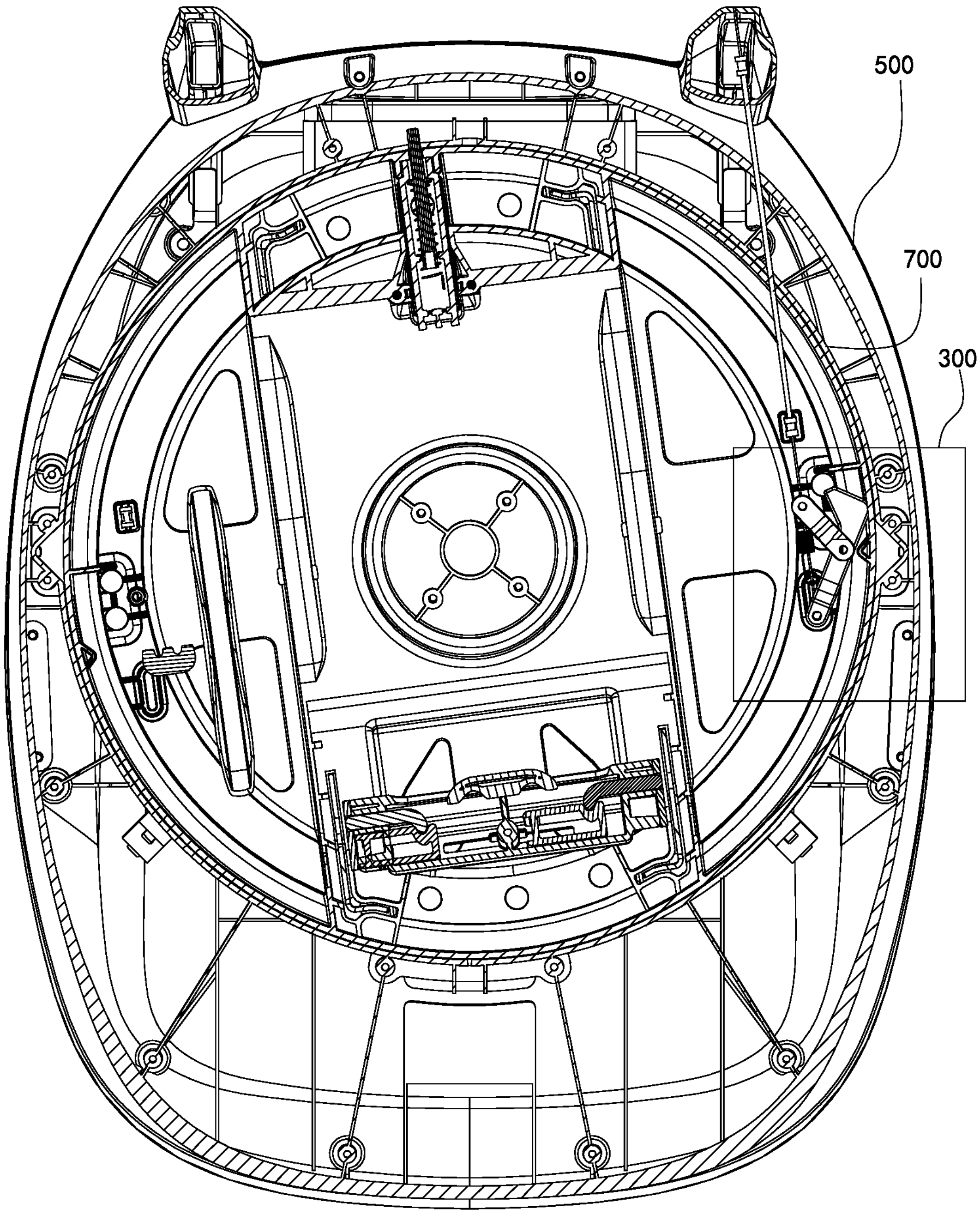
FIG. 16 is a top view of the base and the actuating mechanism, in which the seat is further rotated counterclockwise relative to the base from the position shown in FIG. 14.
Figure 17:
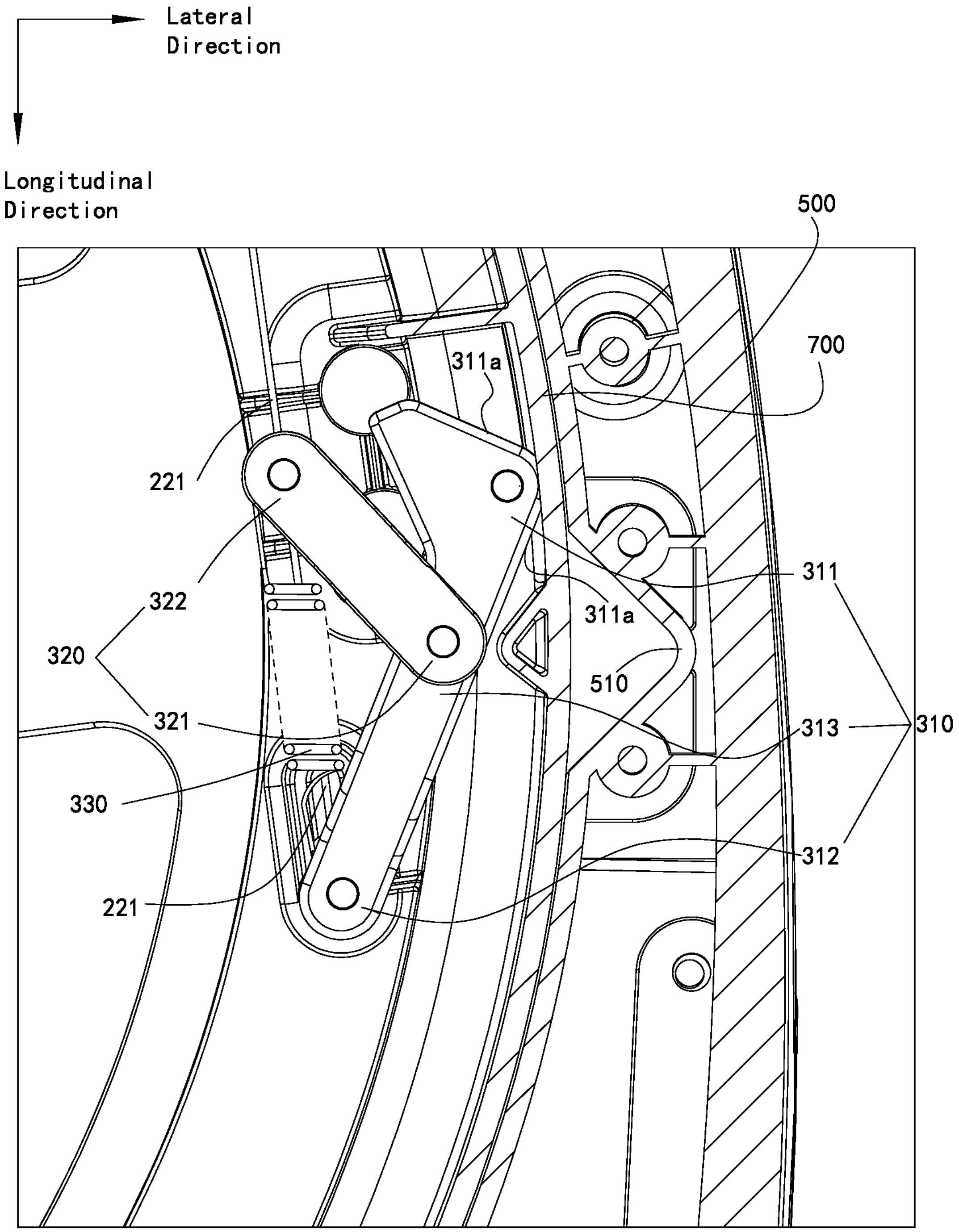
FIG. 17 is a partial enlarged view of the block part in FIG. 16.
Figure 18:
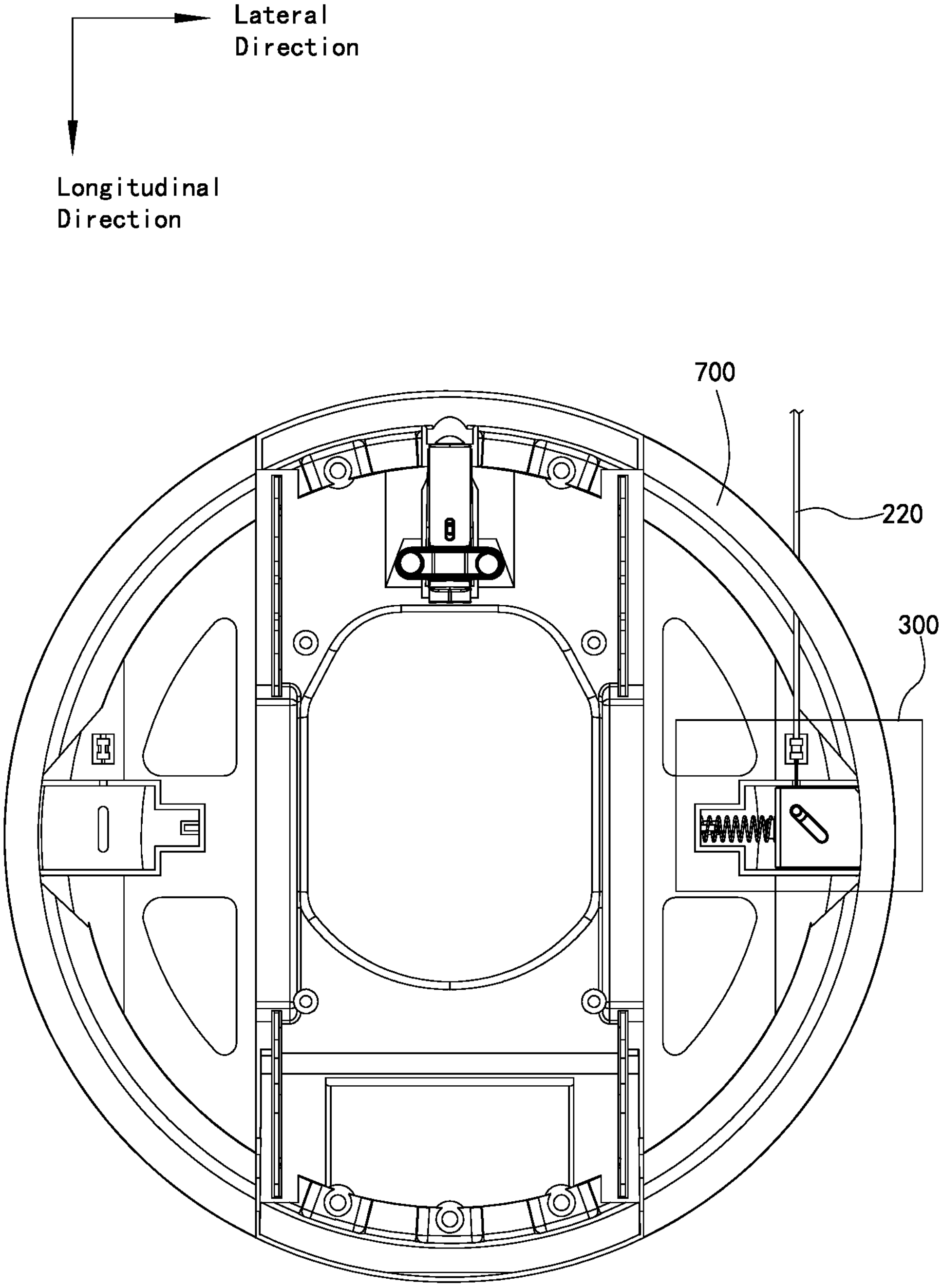
FIG. 18 is a top view of the actuating mechanism according to a second embodiment of the application, in which the seat is in the forward position or the rearward position in respect to the base.
Figure 19:
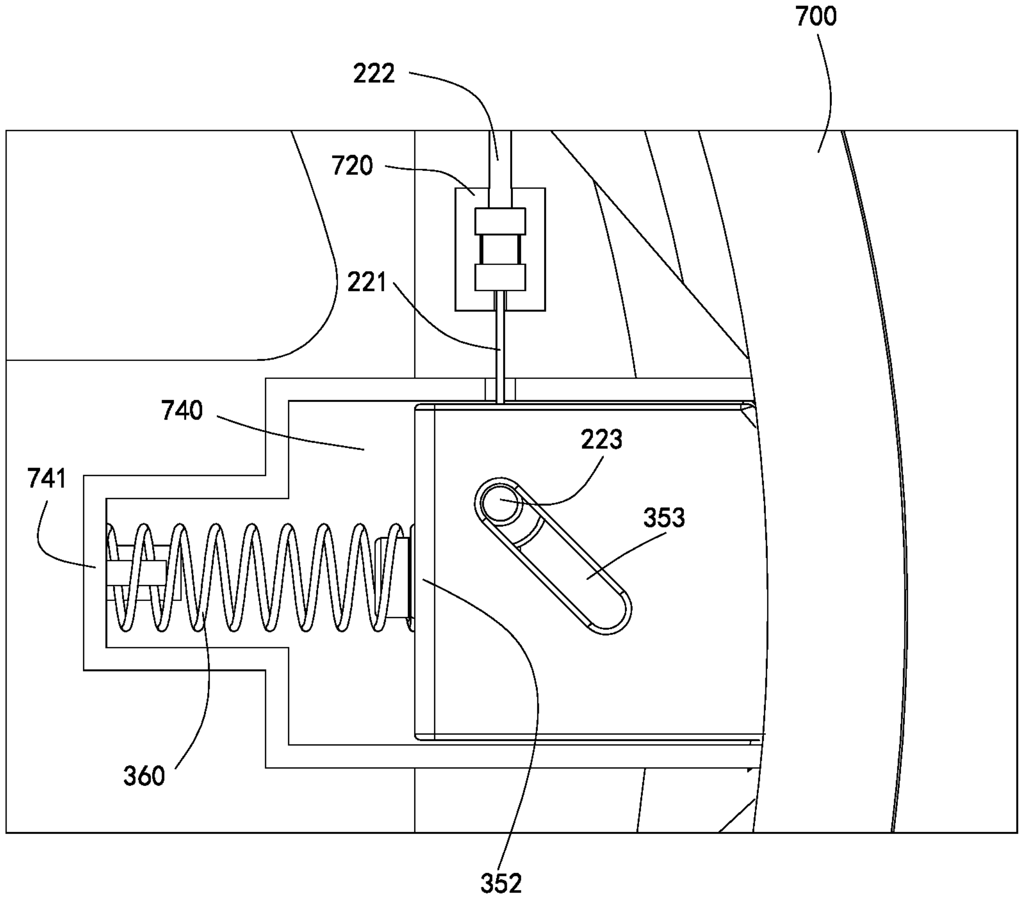
FIG. 19 is a partial enlarged view of the block part in FIG. 18.
Figure 20:
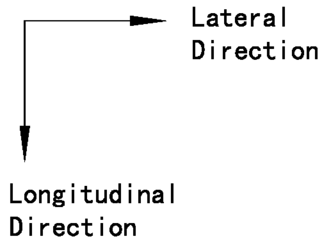
FIG. 20 is a top view of the actuating mechanism, in which a slider is shown in a state of being cut along a lateral-longitudinal plane, and the seat is in the forward position or the rearward position in respect to the base.
Figure 20:
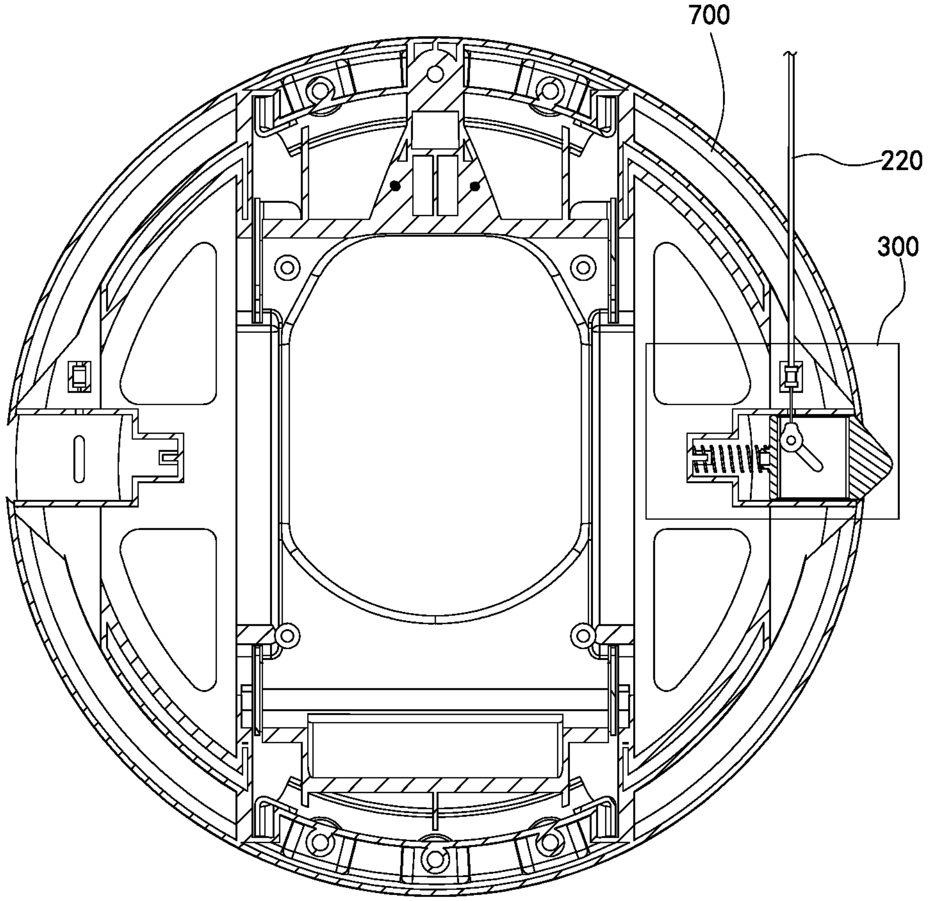
Figure 21:
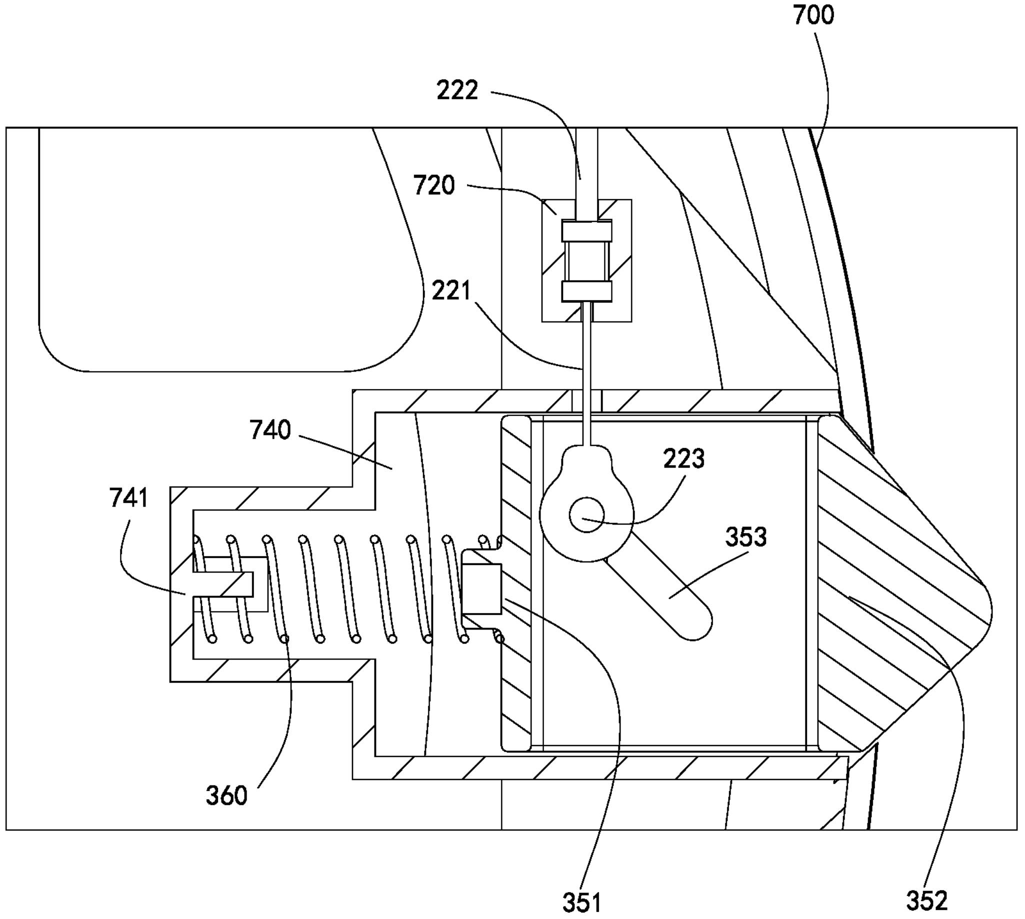
FIG. 21 is a partial enlarged view of the block part in FIG. 20.

The locking lever 310 includes a locking lever first end 311 and a locking lever second end 312. The locking lever first end 311 abuts against the base 500. The locking lever second end 312 is pivotably and slidably coupled to the rotating seat 700 (specifically, to a chute 730 provided in the rotating seat 700), and is connected to the traction member 220. As shown in FIG. 15, when the rotating seat 700 moves relative to the base 500, the locking lever first end 311 is disengaged from the base 500, and the locking lever second end 312 slides in a pulling direction 314 and pulls the traction member 220.

The traction member 220 includes a cable shroud 222 and a cable 221 slidably disposed in the cable shroud 222. The cable shroud 222 has one end connected to a cable shroud fixing portion 720 on the rotating seat 700 and the other end connected to the housing 410 (not shown) of the protection block body 420. The cable 221 has one end connected to the locking lever second end 312 and the other end connected to the cam 210 (see FIGS. 8 to 11). Thus, when the locking lever second end 312 draws the cable 221, the cable 221 will correspondingly draw the cam 210 such that the cam 210 is pivoted toward the direction of abutting abut against the locking pin 120. The cable shroud 222 defines a extension length of the cable 221 between the protection block body 420 and the rotating seat 700, so when the seat 600 (and the side impact protection block 400 as well) moves relative to the rotating seat 700, the tension of the cable 221 does not change.

Figure 14:
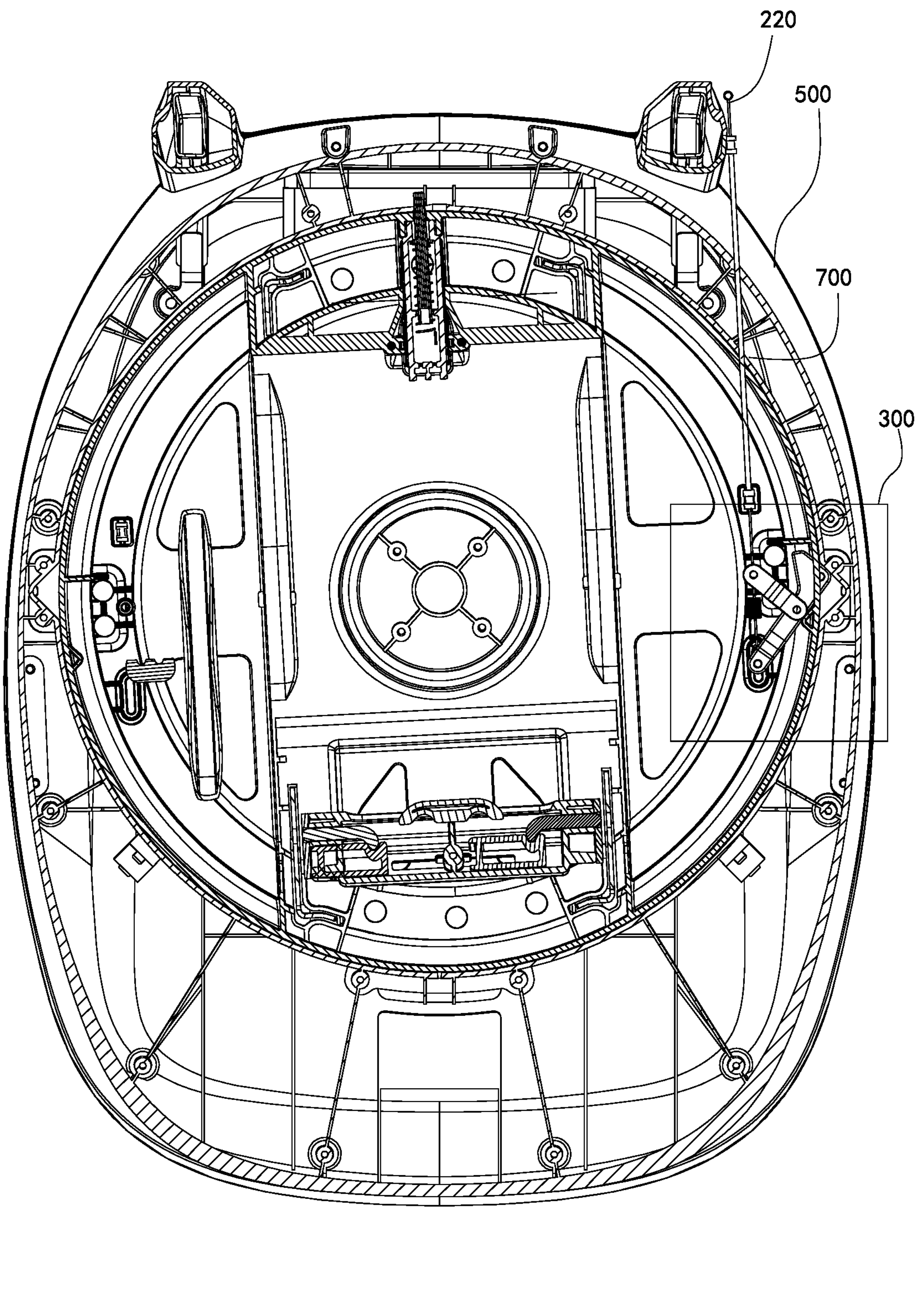
FIG. 14 is a top view of the base and the actuating mechanism, in which the seat rotates counterclockwise relative to the base from the position shown in FIG. 12.

As shown in FIGS. 14 and 15, the locking lever first end 311 is arranged such that when the rotating seat 700 rotates relative to the base 500 (i.e., the rotating seat 700 is in the forward position or the rearward position), the locking lever first end 311 receives a force to abut against the base 500, and this force is converted into a force that pushes the locking lever second end 312 to slide in the pulling direction 314.

The actuating mechanism elastic member 330 is disposed between the rotating seat 700 and the locking lever 310, and biases the locking lever second end 312 in a direction opposite to the pulling direction 314. Specifically, one end of the actuating mechanism elastic member 330 is connected to a fixing pin or a fixing lug (not shown) of the rotating seat 700, and the other end of the actuating mechanism elastic member 330 is connected to the locking lever second end 312 of the locking lever 310 to slide in the chute 730 following the locking lever second end 312. Thus, when there is no relative rotation between the rotating seat 700 and the base 500 (i.e., the rotating seat 700 is positioned between the forward position and the rearward position), the actuating mechanism elastic member resets the locking lever second end 312, and simultaneously resets the locking lever first end 311.

More specifically, the base 500 is provided with a limit slot 510 that is opened to the rotating seat 700. The locking lever 310 extends obliquely from the rotating seat 700 to the base 500 in respect to the pulling direction 314, such that the locking lever first end 311 can be abutted against in the limit slot 510. When the rotating seat 700 and the base 500 move relatively, the locking lever first end 311 is rotated out of the limit slot 510 toward the rotating seat 700.

The base 500 can be provided with a plurality of limit slots 510 along a rotation direction, for example, two limit slots 510 with an interval of 180 degrees. Thus, when the rotating seat 700 (and the seat 600 as well) rotates to the forward position or the rearward position, the locking lever first end 311 can be abutted against in different limit slots 510. In this way, when the rotating seat 700 is in the forward position or the rearward position, because the actuating mechanism 300 cannot actuate the driving mechanism 200, the locking pin 120 in the cam 210 cannot be unlocked, such that the protection block body 420 in kept in the unfolded position.

The locking lever first end 311 may be in the shape of a triangle protruding toward the base 500, and two inclined planes of the triangle respectively form two guide inclined planes 311*a*. The limit slot 510 has portions respectively corresponding to the two guide inclined planes 311*a*. As shown in FIG. 15, when the rotating seat 700 moves relative to the base 500 in different directions, the two guide inclined planes 311*a* are separated from abutment with the limit slots 510, such that the locking lever first end 311 is rotated out of the limit slot 510 toward the rotating seat 700.

The auxiliary rod 320 includes an auxiliary rod first end 321 and an auxiliary rod second end 322. The auxiliary rod first end 321 is pivotably connected to an auxiliary rod engaging portion 313 of the locking lever 310 between the locking lever first end 311 and the locking lever second end 312. The auxiliary rod second end 322 is pivotably connected to the rotating seat 700. More specifically, the auxiliary rod second end 322 is located at a position in a direction opposite to the pulling direction 314 in respect to the locking lever second end 312. In an embodiment, the auxiliary rod engaging portion 313 is disposed at a substantively middle position of the locking lever 310.

As shown in FIGS. 14 and 15, when the rotating seat 700 rotates relative to the base 500, the locking lever first end 311 is pressed by the limit slot 510, such that the locking lever first end 311 swings toward the rotating seat 700. Due to existence of the auxiliary rod 320, swing of the locking lever first end 311 may bring the locking lever second end 312 to slide to the pulling direction 314. This is because if the locking lever first end 311 is swung while the locking lever second end 312 is not sliding, the auxiliary rod 320 will be required to be compressed, but the auxiliary rod 320 is incompressible. Accordingly, with swinging of the locking lever first end 311, the locking lever second end 312 will slide toward the pulling direction 314.

FIGS. 12 to 16 show the case where the rotating seat 700 rotates counterclockwise relative to the base 500. It should be understood, when the rotating seat 700 rotates clockwise relative to the base 500, the way to operate the actuating mechanism 300 is the same.

Referring to FIGS. 18 to 29, the actuating mechanism 300 according to a second embodiment of the application will be described.

Similar to the first embodiment, the base 500 of the second embodiment is also provided with a limit slot 510 that is opened to the rotating seat 700, and the shape of the limit slot 510 in the second embodiment can be the same as that in the first embodiment, so the base 500 and the limit slot 510 are omitted in the description of the second embodiment.

The actuating mechanism 300 of the second embodiment includes a locking member (in this embodiment, a locking slider 350) and a slider elastic member 360.

The rotating seat 700 is provided with a slider slot 740 extending radially (in this embodiment, laterally) and opened toward the base 500. The locking slider 350 is located in the slider slot 740 and can slide close to or away from the base 500. A slider first end 351 of the locking slider 350 is located in the slider slot 740, and the slider second end 352 opposite to the slider first end 351 faces the base 500. The locking slider 350 can extend from the slider slot 740 and abut into the limit slot 510 of the base 500 through the slider second end 352 (as shown in FIGS. 18 to 23).

The slider second end 352 may have a triangle shape or other shapes matching with the limit slot 510. Thus, when the rotating seat 700 and the base 500 move relatively, the limit slot 510 pushes the slider first end 351, such that the locking slider 350 slides away from the base 500 and retracts into the slider slot 740 (as shown in FIGS. 24 to 29).

The locking slider 350 is provided with an actuating slot 353 extending obliquely to the sliding direction of the locking slider 350. A traction head 223 of the traction member 220 is slidably inserted in the actuating slot 353, such that the traction member 220 is pulled when the locking slider 350 slides away from the base 500. More specifically, the actuating slot 353 is closer to the base 500 at the front toward the pulling direction (in this embodiment, the longitudinal direction), and further away from the base 500 at the rear of the pulling direction.

Figure 22:
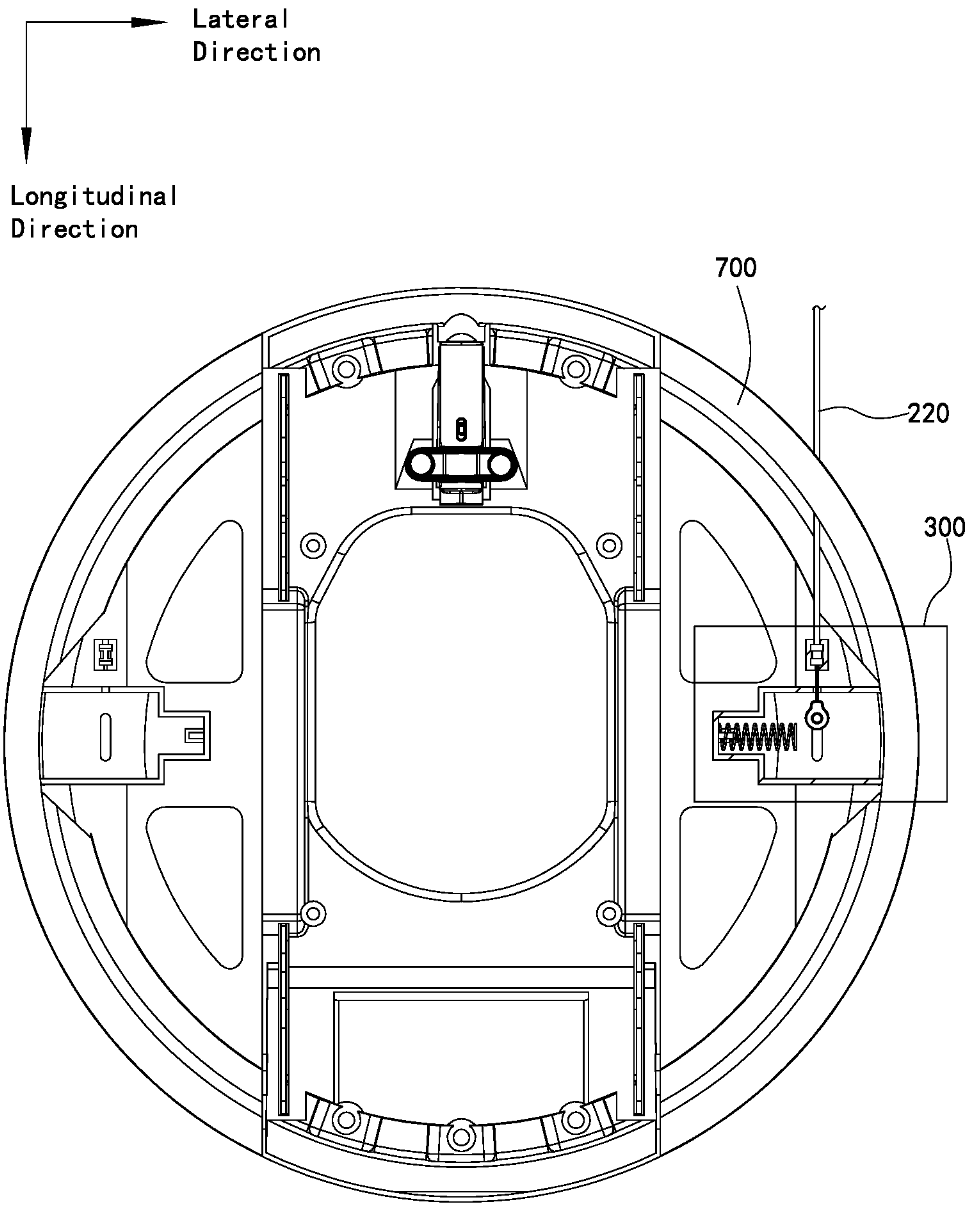
FIG. 22 is a top view of the actuating mechanism, in which the slider is removed to clearly show a traction head and a guiding slot, and the seat is in the forward position or the rearward position in respect to the base.
Figure 23:
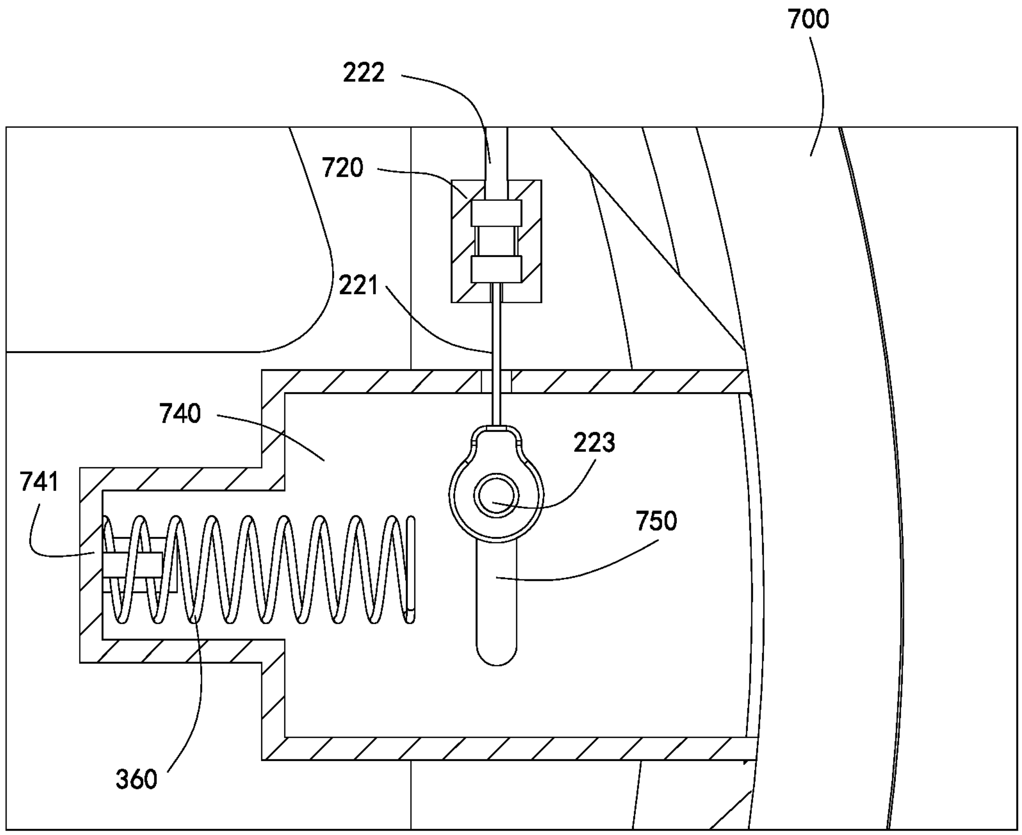
FIG. 23 is a partial enlarged view of the block part in FIG. 22.
Figure 24:
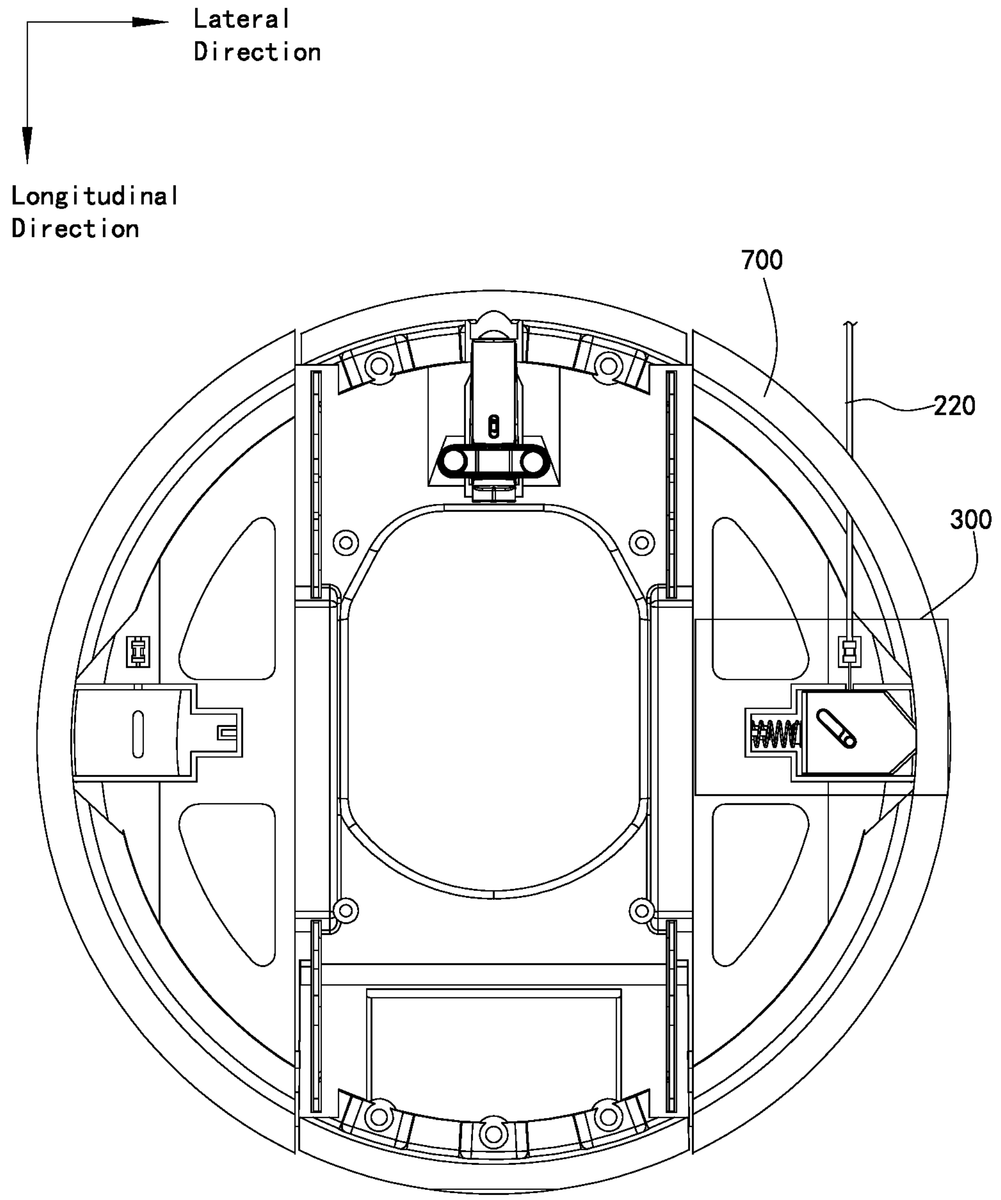
FIG. 24 is a top view of the actuating mechanism, in which the seat is rotated relative to the base.
Figure 25:
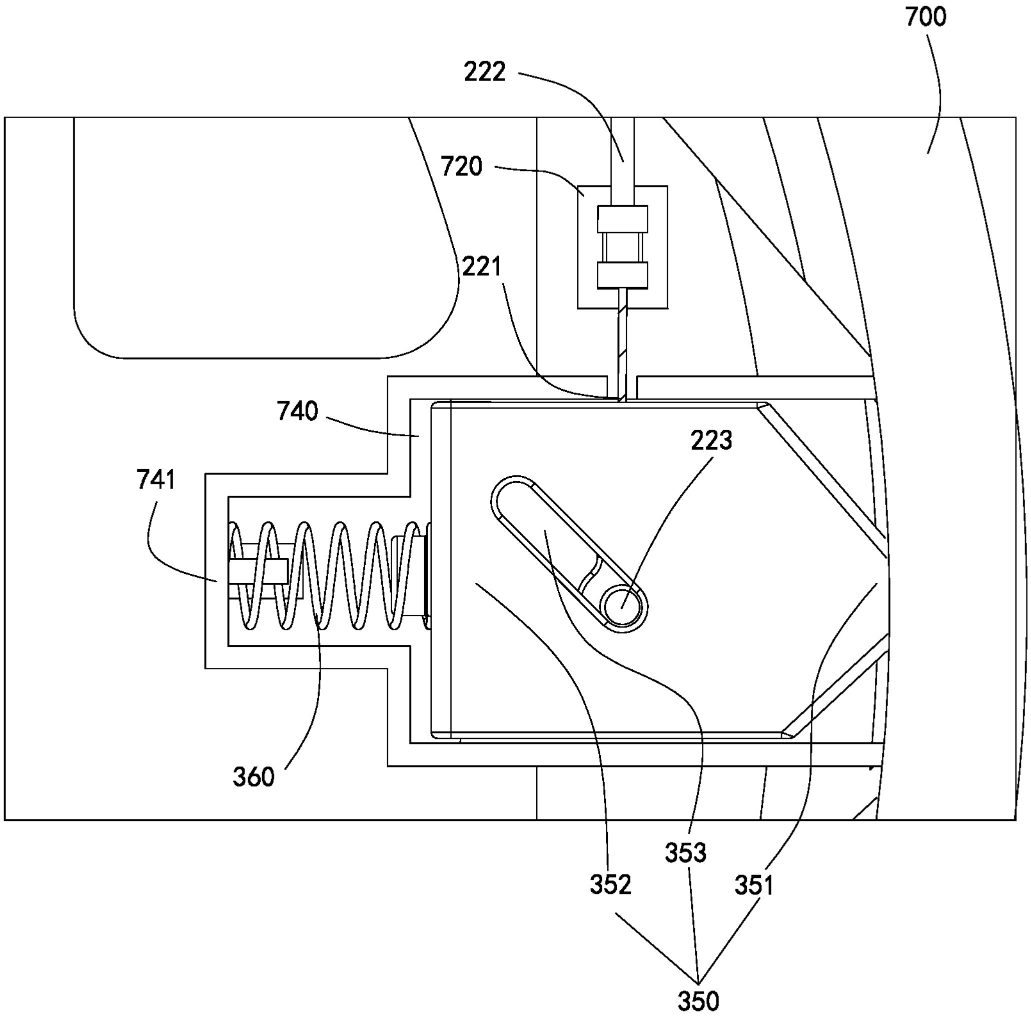
FIG. 25 is a partial enlarged view of the block part in FIG. 24.
Figure 26:
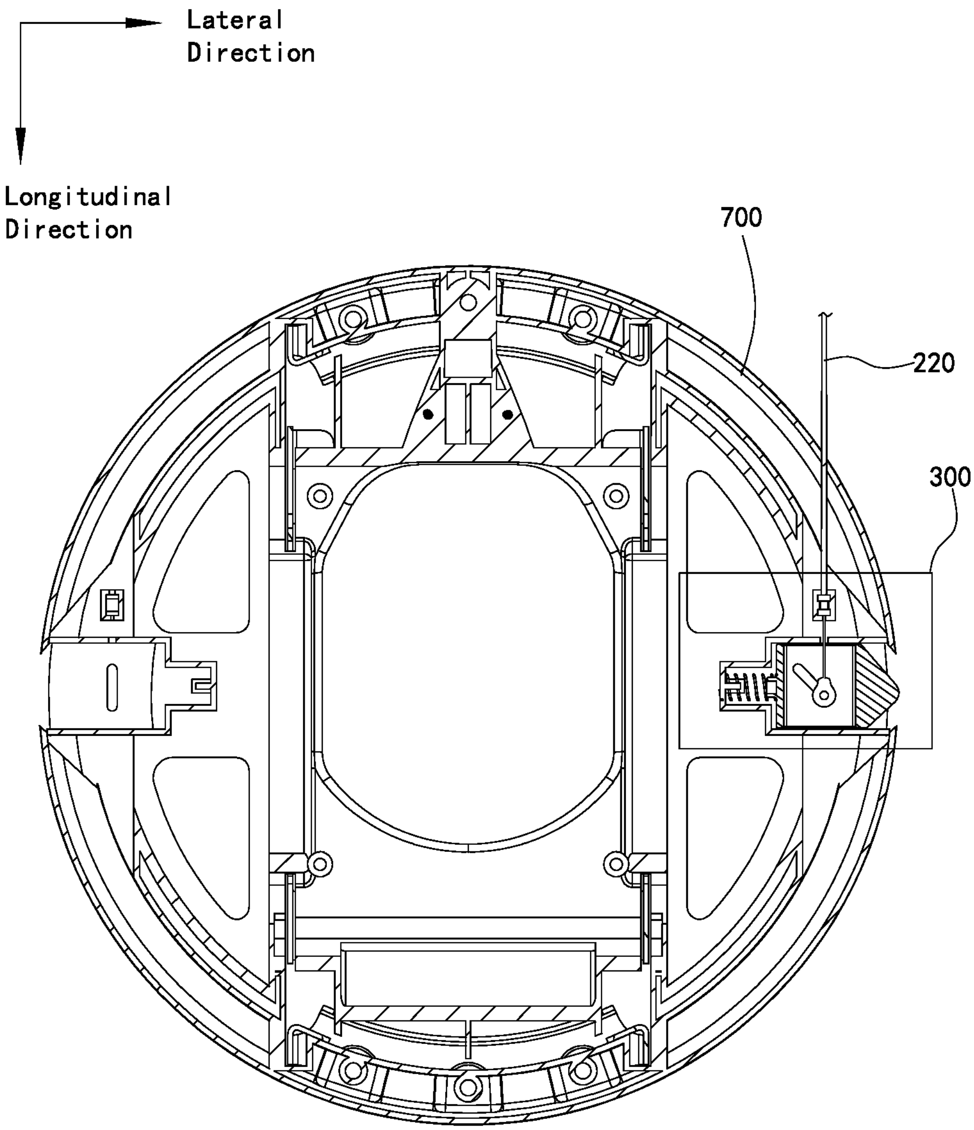
FIG. 26 is a top view of the actuating mechanism, in which the slider is shown in a state of being cut along the lateral-longitudinal plane, and the seat is rotated relative to the base.
Figure 27:
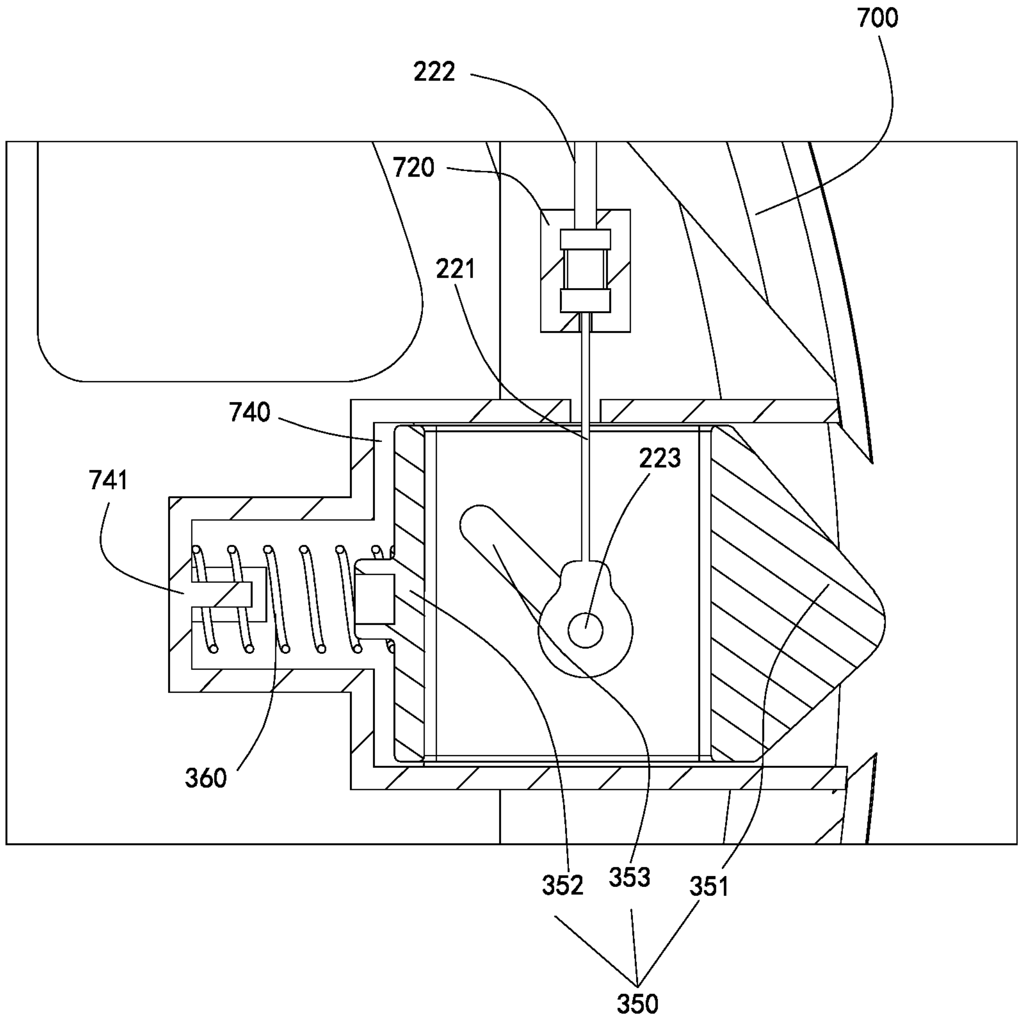
FIG. 27 is a partial enlarged view of the block part in FIG. 26.
Figure 28:
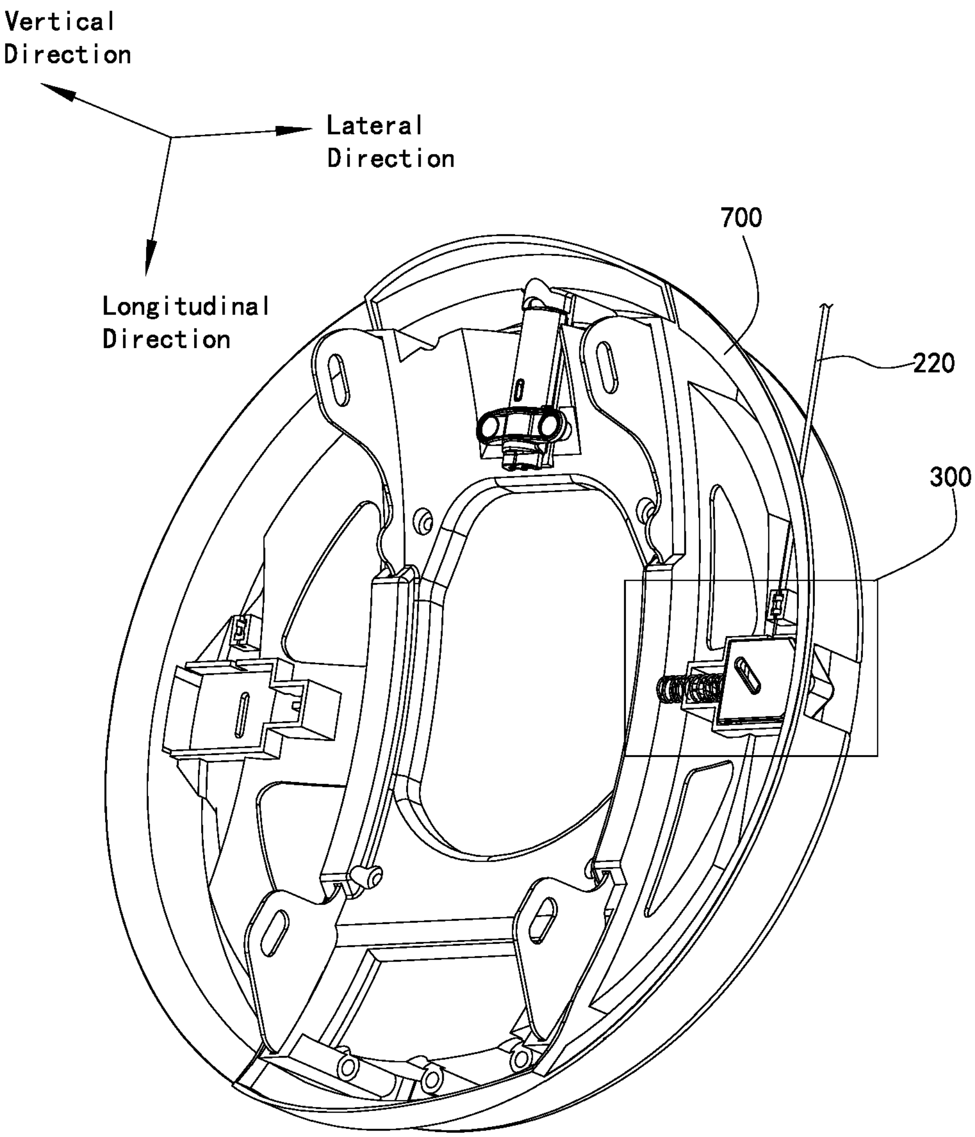
FIG. 28 is a perspective view of the actuating mechanism, in which the seat is rotated relative to the base.
Figure 29:
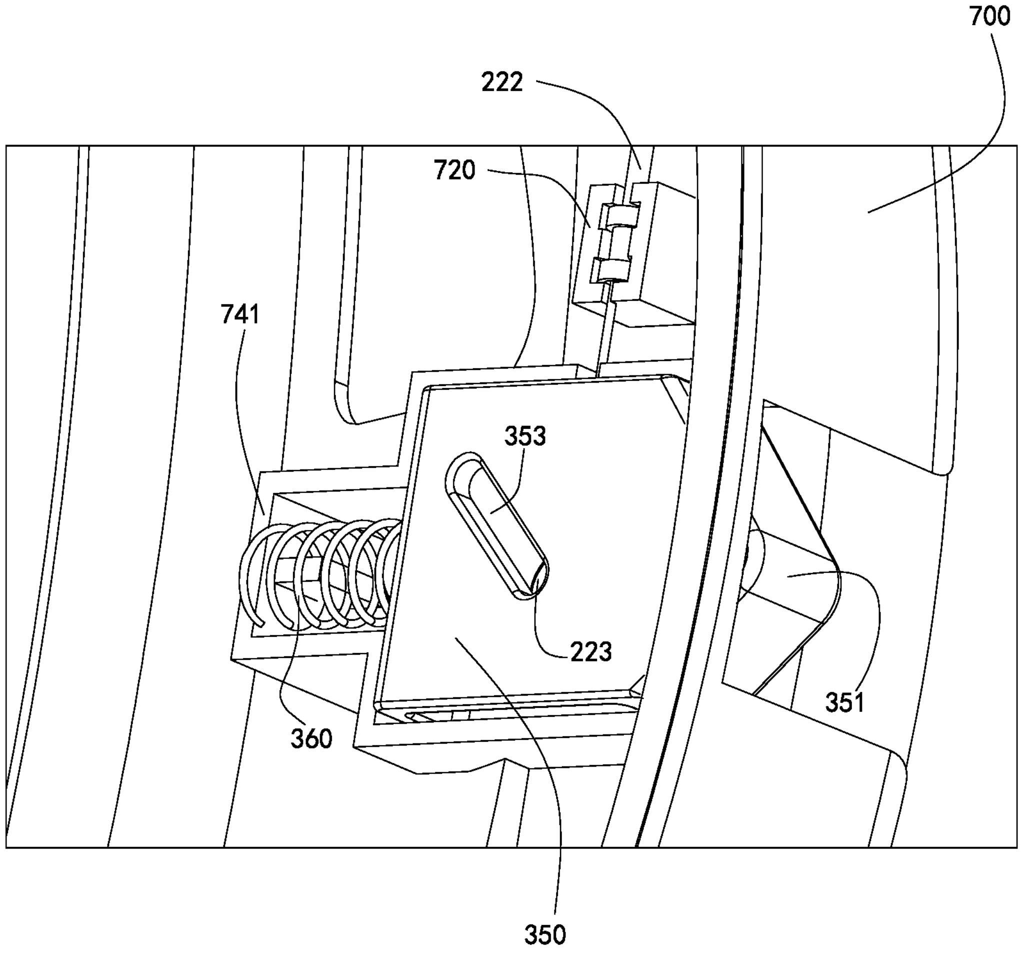
FIG. 29 is a partial enlarged view of the block part in FIG. 28.

The rotating seat 700 may also be provided with a guiding slot 750 (as shown in FIGS. 22 to 23). The guiding slot 750 may be disposed vertically below the locking slider 350, and extend in the pulling direction. The traction head 223 is also slidably inserted in the guiding slot 750, thus being limited by the guiding slot 750 to slide in the pulling direction. More specifically, when the locking slider 350 slides away from the base 500, the traction head 223 begins to slide under pulling of the actuating slot 353; meanwhile, since the traction head 223 is limited by the guiding slot 750, the traction head 223 can only slide in the direction of the guiding slot 750.

The slider elastic member 360 is disposed between the slider second end 352 of the locking slider 350 and the slider slot 740 to bias the locking slider 350 toward the base 500. More specifically, an end of the slider slot 740 away from the base 500 may be provided with a slider elastic member abutting portion 741, and the slider elastic member abutting portion 741 may be formed to be recessed from the end of the slider slot 740 away from the base 500. The slider elastic member 360 may be a compression spring, having one end abutting against the slider elastic member abutting portion 741 and the other end abutting against the slider second end 352.

In conclusion, the application provides an automatic pivoting mechanism, a side impact protection block and a child safety seat using the automatic pivoting mechanism. It should be understood, the automatic pivoting mechanism an also be applied to other devices.

Since the application can be embodied in various forms without departing from the spirit and essence of the application, it should be understood, the above embodiments are not limited to any of the foregoing details, but should be interpreted as broadly as possible within the scope defined by the claims, and therefore all changes that fall within the scope of the claims or their equivalents should be covered by the claims.

LIST OF REFERENCE SIGNS

- 1: Child Safety Seat
  - 100: Locking Mechanism
    - 110: Slotted Portion
      - 111: Locking Slot
      - 112: Cam Slot
    - 120: Locking Pin
    - 130: Locking Elastic Member
    - 140: Release Member
  - 200: Driving Mechanism
    - 210: Cam
      - 211: Driving Portion
      - 212: Avoidance Portion
      - 213: Cable Slot
      - 214: Cam Elastic Member
      - 215: Pivot Axis
    - 220: Traction Member
      - 221: Cable
      - 222: Cable Shroud
      - 223: Traction Head
- 300: Actuating Mechanism
  - 310: Locking Lever (Locking Member)
    - 311: Locking Lever First End (Locking Member First End)
      - 311*a*: Guide Inclined Plane
    - 312: Locking Lever Second End (Locking Member Second End)
    - 313: Auxiliary Rod Engaging Portion
    - 314: Pulling Direction
  - 320: Auxiliary Rod
    - 321: Auxiliary Rod First End
    - 322: Auxiliary Rod Second End
  - 330: Actuating Mechanism Elastic Member
  - 350: Locking Slider (Locking Member)
    - 351: Slider First End (Locking Member First End)

352: Slider Second End (Locking Member Second End)

353: Actuating Slot

360: Slider Elastic Member

400: Side Impact Protection Block

410: Housing

411: Accommodating Space

420: Protection Block Body (First Object)

500: Base (Fourth Object)

510: Limit Slot

540: Top Rod

600: Seat (Second Object)

700: Rotating seat (Third Object)

710: Axis

720: Cable Shroud Fixing Portion

730: Chute

740: Slider Slot

741: Slider Elastic Member Abutting Portion

750: Guiding Slot

What is claimed is:

1. An automatic pivoting mechanism for controlling a relative movement of a first object and a second object, wherein the automatic pivoting mechanism comprises:

a locking mechanism, disposed in the first object and capable of switching between a locked position for preventing the relative movement and an unlocked position for allowing the relative movement;

a driving mechanism, disposed in the second object and capable of being actuated to switch the locking mechanism from the locked position to the unlocked position; and an actuating mechanism, disposed in a third object and actuates the driving mechanism when the third object moves relative to a fourth object, wherein the first object is capable of being pivoted between an unfolded position and a folded position in respect to the second object, and when the first object is in the unfolded position, the locking mechanism is capable of being switched to the locked position, such that the first object is kept in the unfolded position.

2. The automatic pivoting mechanism according to claim 1, wherein:

when the first object is in the folded position, the driving mechanism keeps the locking mechanism in the unlocked position.

3. The automatic pivoting mechanism according to claim 1, wherein the locking mechanism comprises:

a locking pin, slidably disposed in the first object and capable of sliding between an extended position to be engaged with the second object and a retracted position to be disengaged from the second object;

a slotted portion, disposed on the second object and having a locking slot opened toward the locking pin, and the locking pin is at least partially inserted into the locking slot while in the extended position; and a locking elastic member, disposed between the locking pin and the first object and biasing the locking pin to the extended position.

4. The automatic pivoting mechanism according to claim 3, wherein the locking mechanism further comprises:

a release member, connected to the locking pin and capable of being operated from an outside of the first object to switch the locking pin between the extended position and the retracted position.

5. The automatic pivoting mechanism according to claim 3, wherein the driving mechanism comprises:

a cam, pivotably disposed in the second object and capable of abutting against the locking pin, the cam is provided with a driving portion and an avoidance portion arranged circumferentially adjacent to each other, wherein the cam is capable of being pivoted such that the driving portion abuts against the locking pin thereby driving the locking pin to slide to the retracted position, or being pivoted such that the avoidance portion faces the locking pin thereby allowing the locking pin to slide to the extended position; and a traction member, connected between the cam and the actuating mechanism, the actuating mechanism is capable of actuating the cam to be pivoted through the traction member, such that the driving portion abuts against the locking pin.

6. The automatic pivoting mechanism according to claim 5, wherein the driving mechanism further comprises:

a cam elastic member, disposed between the cam and the second object to exert a force for driving the cam to be pivoted such that the avoidance portion faces the locking pin.

7. The automatic pivoting mechanism according to claim 5, wherein the actuating mechanism comprises:

a locking member, connected to the traction member, including:

a locking member first end, abutting against the fourth object; and a locking member second end, movably coupled to the third object;

when the third object and the fourth object move relatively, the locking member first end is disengaged from the fourth object, and the locking member second end slides in a pulling direction and pulls the traction member.

8. The automatic pivoting mechanism according to claim 7, wherein the actuating mechanism comprises:

an actuating mechanism elastic member, disposed between the third object and the locking member, and biases the locking member second end in a direction opposite to the pulling direction.

9. The automatic pivoting mechanism according to claim 8, wherein:

the locking member is a locking lever, the locking member first end is a locking lever first end, the locking member second end is a locking lever second end, and the locking lever second end is connected to the traction member;

the fourth object is provided with a limit slot that is opened to the third object, and the locking lever extends obliquely from the third object to the fourth object in respect to the pulling direction, such that the locking lever first end is capable of being abutted against in the limit slot, when the third object and the fourth object move relatively, the locking lever first end is rotated out of the limit slot toward the third object; and the actuating mechanism further comprises an auxiliary rod including:

an auxiliary rod first end, pivotably connected to an auxiliary rod engaging portion of the locking lever between the locking lever first end and the locking lever second end; and an auxiliary rod second end, pivotably connected to the third object.

10. The automatic pivoting mechanism according to claim 9, wherein:

the auxiliary rod second end is located at position in the direction opposite to the pulling direction in respect to the locking lever second end; and the auxiliary rod first end is connected to a substantively middle position of the locking lever.

11. The automatic pivoting mechanism according to claim 9, wherein:

the locking lever first end is in a shape of a triangle protruding toward the fourth object, two inclined planes of the triangle respectively form two guide inclined planes, the limit slot has portions respectively corresponding to the two guide inclined planes, and when the third object moves relative to the fourth object in different directions, the two guide inclined planes are separated from abutment with the limit slot, such that the locking lever first end is rotated out of the limit slot toward the third object.

12. The automatic pivoting mechanism according to claim 7, wherein:

the locking member is a locking slider, the locking member first end is a slider first end, and the locking member second end is a slider second end;

the fourth object is provided with a limit slot that is opened to the third object;

the locking slider is located in a slider slot of the third object and capable of sliding close to or away from the fourth object, and when the third object and the fourth object move relatively, the limit slot pushes the slider first end, such that the locking slider slides away from the fourth object; and the locking slider is provided with an actuating slot extending obliquely to the sliding direction of the locking slider, a traction head of the traction member is slidably inserted in the actuating slot, such that when the locking slider slides away from the fourth object, the locking slider pulls the traction member.

13. The automatic pivoting mechanism according to claim 12, wherein:

the third object is provided with a guiding slot; the guiding slot is disposed vertically below the locking slider, and extend in the pulling direction; and the traction head is also slidably inserted in the guiding slot, thus being limited to slide in the pulling direction.

14. The automatic pivoting mechanism according to claim 5, wherein:

the driving portion has an arc surface that is convex outwardly in respect to a pivot axis of the cam, and the avoidance portion has an arc surface that is concave inwardly in respect to the pivot axis of the cam.

15. A side impact protection device comprising:

the automatic pivoting mechanism according to claim 1; and a protection block body serve as the first object.

16. A child safety seat comprising:

a base;

a rotating seat, rotatably disposed above the base;

a seat, disposed above the rotating seat; and the side impact protection device according to claim 15, the protection block body of the side impact protection device is disposed on one or two sides of the seat;

wherein the second object is the seat, the third object is the rotating seat, and the fourth object is the base.

17. The child safety seat according to claim 16, wherein:

the seat is fixed to the rotating seat or capable of sliding back and forth or swinging in respect to the rotating seat.

* * * * *